(12) United States Patent
LoBue et al.

(10) Patent No.: US 11,695,370 B2
(45) Date of Patent: Jul. 4, 2023

(54) LOCKING ASSEMBLY FOR A SOLAR PHOTOVOLTAIC ARRAY TRACKER

(71) Applicant: FTC Solar, Inc., Austin, TX (US)

(72) Inventors: Joseph D. LoBue, Rockdale, TX (US); Benjamin A. Fulcher, Belton, TX (US)

(73) Assignee: FTC Solar, Inc., Austin, TX (US)

( * ) Notice: Subject to any disclaimer, the term of this patent is extended or adjusted under 35 U.S.C. 154(b) by 0 days.

(21) Appl. No.: 17/814,336

(22) Filed: Jul. 22, 2022

(65) Prior Publication Data
US 2023/0030803 A1     Feb. 2, 2023

Related U.S. Application Data

(60) Provisional application No. 63/203,528, filed on Jul. 27, 2021.

(51) Int. Cl.
*H02S 20/32*     (2014.01)
*H02S 30/10*     (2014.01)

(52) U.S. Cl.
CPC ............. *H02S 20/32* (2014.12); *H02S 30/10* (2014.12)

(58) Field of Classification Search
CPC ................................ H02S 20/32; H02S 30/10
See application file for complete search history.

(56) References Cited

U.S. PATENT DOCUMENTS

| | | |
|---|---|---|
| 2,186,266 A | 1/1940 | Onions |
| 3,106,992 A | 10/1963 | Sherburne |
| 3,762,514 A | 10/1973 | Freitag |
| 4,088,286 A | 5/1978 | Masclet et al. |
| 4,328,789 A | 5/1982 | Nelson |
| 4,493,659 A | 1/1985 | Iwashita |
| 4,632,091 A | 12/1986 | Wiens |
| 5,111,917 A | 5/1992 | Rothamel et al. |
| 5,158,161 A | 10/1992 | Yamaoka et al. |
| 5,193,655 A | 3/1993 | Sasaki et al. |

(Continued)

FOREIGN PATENT DOCUMENTS

| | | |
|---|---|---|
| CN | 212163236 U | 12/2020 |
| JP | 2014114838 A | 6/2014 |
| KR | 807776 B1 | 2/2021 |

OTHER PUBLICATIONS

International Search Report and Written Opinion issued by the International Searching Authority issued in PCT/US2022/38138 dated Oct. 25, 2022, pp. 1-10.

*Primary Examiner* — Jayne L Mershon
(74) *Attorney, Agent, or Firm* — Armstrong Teasdale LLP

(57) ABSTRACT

Solar tracker systems include a torque tube, a column supporting the torque tube, a solar panel connected to the torque tube, and a locking assembly. The locking assembly includes a first end pivotably connected to the torque tube and a second end pivotably connected to the column. A shell defines a fluid chamber and a piston is positioned within the shell. The piston includes a seal and defines compression and extension portions of the fluid chamber. A flow path extends between the compression portion and the extension portions. A first valve assembly controls fluid flow in a first direction through the flow path and a second valve assembly controls fluid flow in a second direction through the flow path. The valve assemblies are each passively moveable from an unlocked state to a locked state in response to movement of the piston.

14 Claims, 23 Drawing Sheets

(56) References Cited

U.S. PATENT DOCUMENTS

| | | |
|---|---|---|
| 5,280,863 A | 1/1994 | Schmittle |
| 5,310,315 A | 5/1994 | Lafortune et al. |
| 5,653,315 A | 8/1997 | Ekquist et al. |
| 6,070,681 A | 6/2000 | Catanzarite et al. |
| 6,175,989 B1 | 1/2001 | Carpenter et al. |
| 6,353,733 B1 | 3/2002 | Murray et al. |
| 6,363,928 B1 | 4/2002 | Anderson, Jr. |
| 6,422,360 B1 | 7/2002 | Oliver et al. |
| 6,676,119 B2 | 1/2004 | Becker et al. |
| 7,658,071 B1 | 2/2010 | McDermott |
| 7,997,264 B2 | 8/2011 | Sankrithi |
| 8,274,028 B2 | 9/2012 | Needham et al. |
| 8,387,762 B2 | 3/2013 | Kondo et al. |
| 8,490,761 B2 | 7/2013 | Kondo |
| 8,502,129 B2 | 8/2013 | Miller et al. |
| 8,511,297 B2 | 8/2013 | McNeil-Yeckel et al. |
| 8,590,678 B2 | 11/2013 | Bombrys et al. |
| 8,616,351 B2 | 12/2013 | Roessle et al. |
| 8,662,072 B2 | 3/2014 | Butler et al. |
| 8,820,699 B2 | 9/2014 | Hertel et al. |
| 8,829,330 B2 | 9/2014 | Meyer et al. |
| 8,857,110 B2 | 10/2014 | Constantinou et al. |
| 8,899,560 B2 | 12/2014 | Allen et al. |
| 8,905,016 B2 | 12/2014 | Sakai et al. |
| 9,067,470 B2 | 6/2015 | Shimasaki et al. |
| 9,067,471 B2 | 6/2015 | Tuts et al. |
| 9,068,616 B1 | 6/2015 | Serbu |
| 9,151,355 B2 | 10/2015 | Chen |
| 9,156,520 B2 | 10/2015 | Zyl et al. |
| 9,206,616 B2 | 12/2015 | Sarlis et al. |
| 9,349,899 B2 | 5/2016 | Schwartz et al. |
| 9,454,001 B2 | 9/2016 | Lehmann et al. |
| 9,593,736 B2 | 3/2017 | Jordan et al. |
| 9,667,756 B2 | 6/2017 | Koo et al. |
| 9,969,233 B2 | 5/2018 | Legtize |
| 10,029,534 B2 | 7/2018 | Giovanardi et al. |
| 10,171,024 B2 | 1/2019 | Polk |
| 10,174,802 B2 | 1/2019 | Osika et al. |
| 10,180,171 B2 | 1/2019 | Laird et al. |
| 10,544,850 B2 | 1/2020 | Ruan |
| 10,648,528 B2 | 5/2020 | Kull et al. |
| 10,697,514 B2 | 6/2020 | Marking |
| 10,848,097 B1 | 11/2020 | Needham et al. |
| 11,133,775 B1 | 9/2021 | Lobue et al. |
| 2005/0133319 A1* | 6/2005 | Wilhelm ............... F16F 9/5126 188/281 |
| 2006/0102440 A1 | 5/2006 | Nygren et al. |
| 2007/0034466 A1 | 2/2007 | Paesmans et al. |
| 2008/0168981 A1 | 7/2008 | Cummings et al. |
| 2010/0095955 A1 | 4/2010 | Martinex |
| 2011/0290307 A1 | 5/2011 | Workman |
| 2012/0174962 A1 | 7/2012 | Koningstein et al. |
| 2012/0279487 A1 | 11/2012 | Pineau et al. |
| 2012/0305052 A1 | 12/2012 | Bruneau |
| 2013/0090808 A1 | 4/2013 | Lemme et al. |
| 2013/0280064 A1 | 10/2013 | Van Steinvoren |
| 2014/0084528 A1 | 3/2014 | Murakami |
| 2014/0366929 A1 | 12/2014 | Blau |
| 2015/0033740 A1 | 2/2015 | Anderson et al. |
| 2015/0377518 A1 | 12/2015 | Maxey et al. |
| 2016/0025174 A1 | 1/2016 | Lizarraga |
| 2016/0068373 A1 | 3/2016 | Chin et al. |
| 2016/0153517 A1 | 6/2016 | Lizarraga |
| 2016/0329860 A1 | 11/2016 | Kalus et al. |
| 2016/0365823 A1 | 12/2016 | French et al. |
| 2017/0093329 A1 | 3/2017 | Jensen |
| 2017/0362822 A1 | 12/2017 | Kams et al. |
| 2018/0013380 A1* | 1/2018 | Childress ............... H02S 20/32 |
| 2018/0062566 A1 | 3/2018 | Grushkowitz et al. |
| 2018/0091088 A1 | 3/2018 | Barton et al. |
| 2018/0154079 A1 | 6/2018 | Anderson et al. |
| 2018/0163364 A1 | 6/2018 | Huissoon |
| 2018/0212551 A1 | 7/2018 | Polk |
| 2018/0254740 A1 | 9/2018 | Corio |
| 2018/0302026 A1 | 10/2018 | Basel et al. |
| 2018/0328440 A1* | 11/2018 | Ruan ..................... F16F 9/185 |
| 2019/0020302 A1 | 1/2019 | Chen et al. |
| 2019/0072150 A1 | 3/2019 | Kull et al. |
| 2019/0168561 A1 | 6/2019 | Bucknell |
| 2019/0253021 A1 | 8/2019 | Needham et al. |
| 2019/0372512 A1 | 12/2019 | Betts et al. |
| 2020/0036325 A1 | 1/2020 | Poivet |
| 2020/0076356 A1 | 3/2020 | Cherukupalli et al. |
| 2020/0076359 A1 | 3/2020 | Bahn |
| 2020/0304059 A1 | 9/2020 | Henderson et al. |
| 2020/0400772 A1 | 12/2020 | Corio |
| 2021/0044252 A1 | 2/2021 | Needham et al. |
| 2021/0159848 A1 | 5/2021 | Needham et al. |
| 2021/0311507 A1 | 10/2021 | Needham et al. |
| 2021/0399679 A1 | 12/2021 | Macomber et al. |
| 2022/0123689 A1 | 4/2022 | Creasy et al. |

* cited by examiner

LOCKING ASSEMBLY FOR A SOLAR PHOTOVOLTAIC ARRAY TRACKER

CROSS-REFERENCE TO RELATED APPLICATION

This application claims the benefit of U.S. Provisional Patent Application No. 63/203,528, filed Jul. 27, 2021, which is incorporated herein by reference in its entirety.

FIELD

The field relates generally to systems for solar tracking and for locking a solar photovoltaic (PV) array.

BACKGROUND

Solar arrays are devices that convert light energy into other forms of useful energy (e.g., electricity or thermal energy). One example of a solar array is a photovoltaic (PV) array that converts sunlight into electricity. Some photovoltaic arrays are configured to follow or track the path of the sun to minimize the angle of incidence between incoming sunlight and the photovoltaic array.

Photovoltaic array assemblies include a movable mounting system that supports and tilts the photovoltaic array and connects it to an anchoring structure. During use, the photovoltaic array may be exposed to environmental loads, which can wear and cause damage to various components of the array. For example, during high load events, such as a high wind event, it may be desirable to stow the panels in a flat orientation to reduce drag on the panels and prevent wear in the array. However, during high wind events, oscillating wind loads on the panels may cause portions of the array to twist and drift from the flat orientation. As the panels are twisted out of the flat orientation, drag on the panels is also increased, potentially further exacerbating the twisting of the system. This effect. also commonly referred to as "torsional divergence," can also wear and cause damage to the array. Selectively controllable locks, also referred to as "active locks," may be used to reduce torsional divergence of the arrays during high wind events. However, such locks generally require motors and/or electronic subsystems that add additional cost and complexity to the arrays. Accordingly, a need exists for systems for passively securing photovoltaic arrays that provide low resistance to movement of the panels during normal operation yet also serve as a torsional locking mechanism during high load events.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a solar tracker system includes a torque tube, a column supporting the torque tube, a solar panel connected to the torque tube, and a locking assembly. The locking assembly includes a first end pivotably connected to the torque tube and a second end pivotably connected to the column. The locking assembly further includes a shell defining a fluid chamber therein and a piston positioned within the shell. The piston includes a seal that seals against the shell. The piston at least partially defines a compression portion of the fluid chamber and an extension portion of the fluid chamber. The locking assembly further includes a flow path extending between the compression portion of the fluid chamber and the extension portion of the fluid chamber, a first valve assembly, and a second valve assembly. The first valve assembly controls fluid flow in a first direction through the flow path from the compression portion to the extension portion. The second valve assembly controls fluid flow in a second direction through the flow path from the extension portion to the compression portion. The first valve assembly and the second valve assembly are each passively moveable from an unlocked state to a locked state in response to movement of the piston.

In another aspect, a locking assembly for a solar tracker system includes a shell defining a fluid chamber therein and a piston positioned within the shell. The piston includes a seal that seals against the shell and the piston at least partially defines a compression portion of the fluid chamber and an extension portion of the fluid chamber. The locking assembly further includes a flow path extending between the compression portion of the fluid chamber and the extension portion of the fluid chamber, a first valve assembly for controlling fluid flow in a first direction through the flow path from the compression portion to the extension portion, and a second valve assembly for controlling fluid flow in a second direction through the flow path from the extension portion to the compression portion. The first valve assembly and the second valve assembly are each passively moveable from an unlocked state to a locked state in response to movement of the piston.

In yet another aspect, a solar tracker system includes a torque tube, a column supporting the torque tube, a solar panel connected to the torque tube, and a locking assembly. The locking assembly has a first end pivotably connected to the torque tube and a second end pivotably connected to the column. The locking assembly includes a shell defining a fluid chamber therein and a piston positioned within the shell and at least partially defining a compression portion of the fluid chamber and an extension portion of the fluid chamber. The locking assembly further includes a flow path extending between the compression portion of the fluid chamber and the extension portion of the fluid chamber, a first valve assembly, and a second valve assembly. The first valve assembly fluidly connects the compression portion of the fluid chamber with the flow path and is passively movable to restrict fluid flow from the compression portion into the flow path. The second valve assembly fluidly connects the extension portion of the fluid chamber with the flow path and is passively movable to restrict fluid flow from the extension portion into the flow path.

BRIEF DESCRIPTION OF THE DRAWINGS

Corresponding reference characters indicate corresponding parts throughout the drawings.

DETAILED DESCRIPTION

Figure 1:
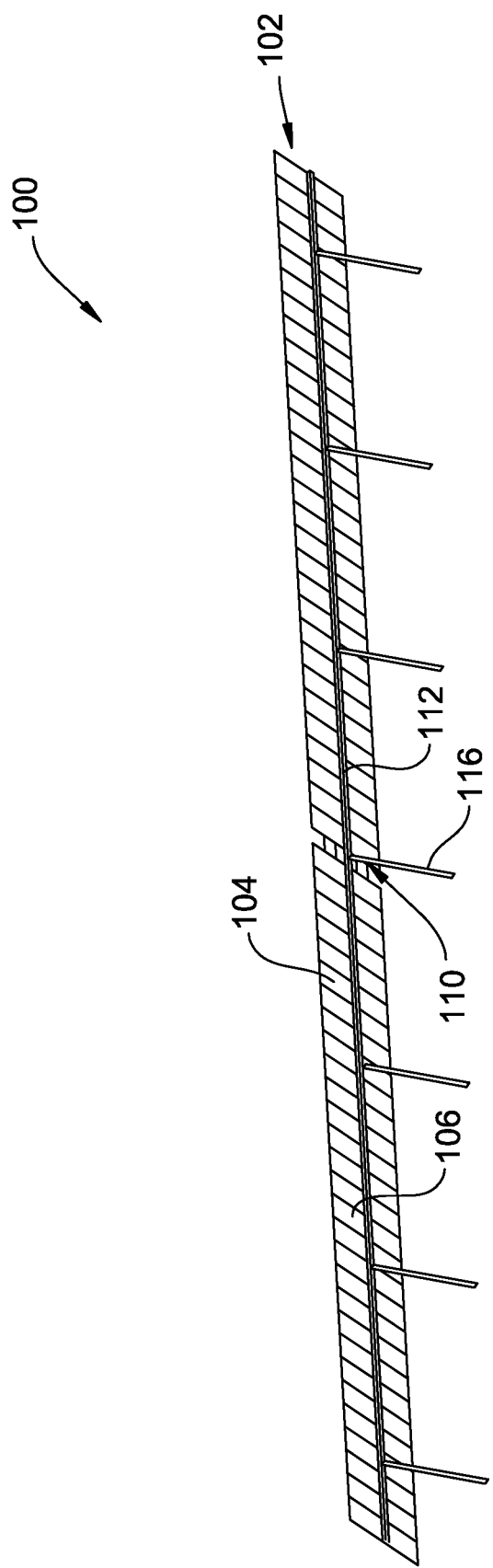
FIG. 1 is a perspective view of a solar tracker system.
Figure 4:
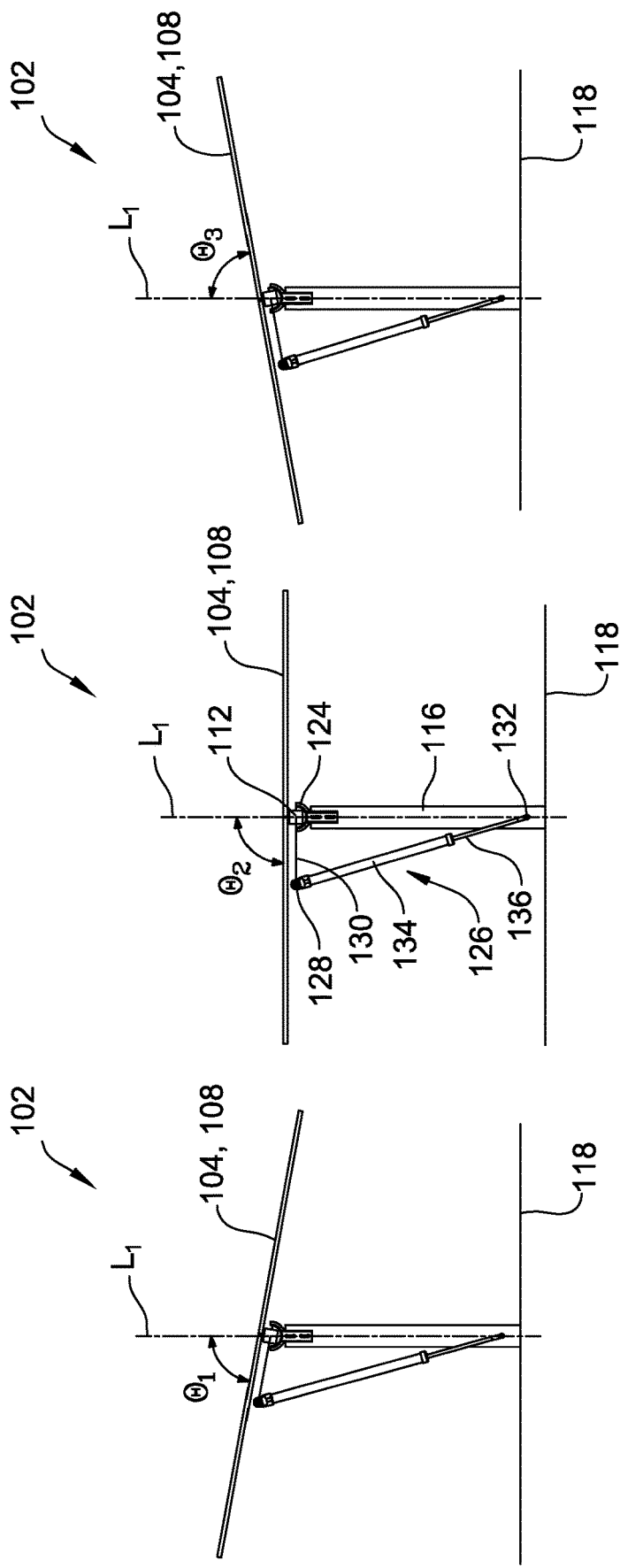
FIG. 4A is a schematic side view showing of a portion of the solar tracker system of FIG. 1 in a first orientation.
FIG. 4B is a schematic side view of the portion of the solar tracker system shown in FIG. 4A in a second orientation.
FIG. 4C is a schematic side view of the portion of the solar tracker system shown in FIG. 4A in a third orientation.

An example embodiment of a solar tracker system 100 including a PV solar array row 102 is shown in FIG. 1. The solar array row 102 may be used in a solar power generation system. The solar array row 102 is used to generate power, typically in combination with a plurality of similarly arranged solar array rows 102 (not all rows shown). The solar array row 102 includes a plurality of solar panel assemblies 104. Each solar panel assembly 104 extends between a back side 106 and a panel side 108 (FIGS. 4A-4C). The solar panel assemblies 104 are rectangular shaped. In other embodiments, the solar panel assemblies 104 may have any shape that allows the solar array row 102 to function as described herein.

The solar array row 102 includes a mounting assembly 110 that supports the plurality of solar panel assemblies 104. The mounting assembly 110 includes a torque tube 112 to which the solar panel assemblies 104 are connected. The solar panel assemblies 104 may be connected to the torque tube 112 by any suitable method including, for example, fasteners such as bolts and clips or by a clamping device. The solar panel assemblies 104 pivot about a rotational axis that extends through the torque tube 112 (i.e., extending into the page in FIGS. 4A-4C).

The torque tube 112 of this embodiment is pivotably connected to a plurality of support columns 116. In the illustrated embodiment, the support columns 116 are I-beam posts. Other support columns 116 may be used in other embodiments (e.g., a tubular support column 116). The support columns 116 may be connected to a base 118, shown as a foundation in the ground-mounted embodiment of FIGS. 4A-4C. Generally, the base 118 may include any structure that anchors the row, for example a frame member (e.g., a horizontal rail that the solar panel assemblies 104 with one or more posts securing the rail to the ground), stanchion, ram, pier, ballast, post or the like. The base 118 may also include a foundation which encases a portion of the support columns 116 or may include brackets, fasteners or the like that connect to the support columns 116. In other embodiments, the row 102 may be connected to another structure which supports the solar panels 104 (e.g., roof-top applications).

The solar panel assemblies 104 are a photovoltaic array. In other embodiments, the solar panel assemblies 104 include a thermal collector that heats a fluid such as water. In such embodiments, the panel assemblies may include tubes of fluid which are heated by solar radiation. While the present disclosure may describe and show a photovoltaic array, the principles disclosed herein are also applicable to a solar array configured as a thermal collector unless stated otherwise.

Figure 2:
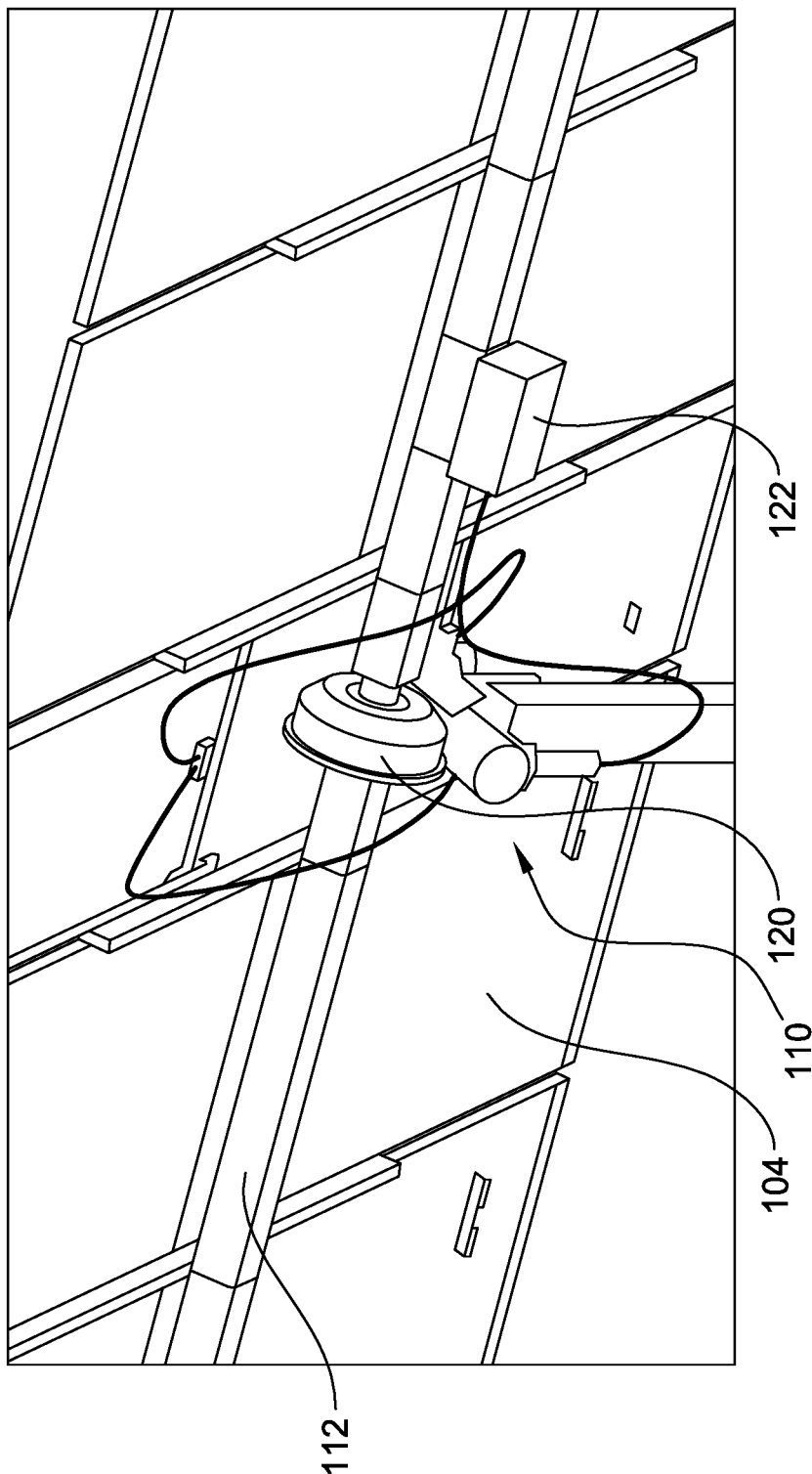
FIG. 2 is an enlarged perspective view of the solar tracker system of FIG. 1.

Referring to FIG. 2, the mounting assembly 110 also includes a drive 120 that adjusts the position of the solar panel assemblies 104. The drive 120 engages the torque tube 112 such that operation of the drive 120 causes the torque tube 112 to pivot relative to the support columns 116 (FIG. 1). The drive 120 is disposed between the torque tube 112 and a base 118 (FIGS. 4A-4C) to which the support columns 116 are connected. The drive 120 in the embodiment of FIG. 2 is a slew drive, though the mounting assembly 110 may include any drive that enables the mounting assembly 110 to function as described herein.

The solar array row 102 includes a row controller housing 122. The row controller 122 contains a row controller 602 (FIG. 23) therein. The row controller 602 is communicatively connected to the drive 120 and operable to control operation of the drive 120. During operation, the row controller 122 controls the drive 120 to rotate the torque tube 112 such that the panel assemblies follow the path of the sun, such as during movement of the sun over a course of a day. In some embodiments, the row controller positions the panel assemblies based on seasonal variations in the position of the sun. The solar array row 102 may be a single axis tracker or a dual axis tracker with the torque tube 112 defining at least one axis of rotation of the array. The other axis of rotation may be a vertical axis with rotation being achieved by a rotatable coupling and, optionally, a second drive (not shown).

Figure 3:
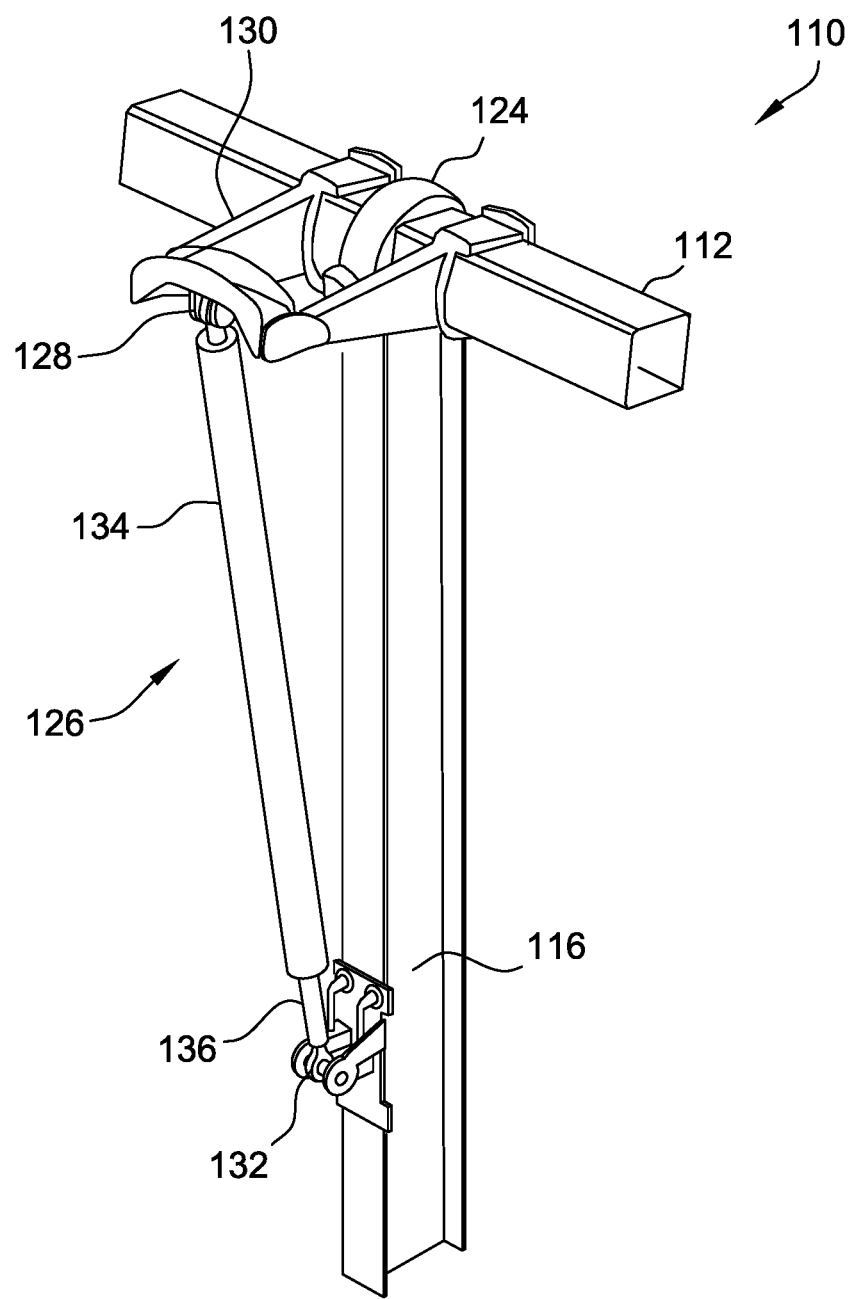
FIG. 3 is a perspective view of a mounting assembly of the solar tracker system of FIG. 1.

FIG. 3 shows a mounting assembly 110 for use with the solar tracker system 100 of FIG. 1. In the example embodiment, the torque tube 112 is connected to the support column 116 via a pivoting member 124. The pivoting member 124 may include a bushing or bearing that rotates within a support coupled to the support column 116 to allow the torque tube 112 to rotate relative to the support column 116.

In other embodiments, the pivoting member 124 is a roller bearing (e.g., ball bearing). The pivoting member 124 is also connected to the support column 116 by the support. Selective rotation of the torque tube 112 may allow for repositioning the solar panels 104 (FIG. 1) to follow a position of the sun during use.

The mounting assembly 110 of FIG. 3 further includes a passive locking assembly 126 (also referred to herein as "locking assembly") extending from a first end 128 pivotably coupled to a linkage member 130 (illustrated schematically in FIG. 3) to a second end 132 pivotably coupled to the support column 116. The locking assembly 126 includes an outer tube 134 or "outer shell" extending from the first end 128. A piston shaft 136 of the locking assembly 126 extends from the outer tube 134 to the second end 132.

FIGS. 4A-4C show a portion of the solar array row 102 with the solar panel assembly 104 in a first orientation, a second orientation, and a third orientation, respectively. The support column 116 defines a longitudinal axis $L_1$. More specifically, the support column 116 is coupled to the base 118 such that the longitudinal axis $L_1$ is generally perpendicular to the base 118 and a ground level (not shown). In other embodiments, the longitudinal axis $L_1$ of the support column 116 may be obliquely oriented relative to the base 118 and/or ground level.

The solar panel assembly 104 in the first orientation is oriented at a first oblique angle $\theta_1$ relative to the longitudinal axis $L_1$. In the second orientation, the solar panel assembly 104 is oriented at a second angle $\theta_2$ relative to the longitudinal axis $L_1$. In the third orientation, the solar panel assembly 104 is oriented at a third oblique angle $\theta_3$ relative to the longitudinal axis $L_1$, and in an opposite direction from the first orientation. In the illustrated embodiment, the first angle and third angle are approximately the same. More specifically, the first angle and the third angle are approximately 80 degrees and the second angle $\theta_2$ is approximately 90 degrees. The solar array row 102 is operable to orient the panel assembly about the rotational axis, by rotating the torque tube 112 relative to the support columns 116, such that the panel assembly is substantially vertical and faces a first direction and such that the panel assembly is substantially vertical and faces a second opposite direction. In other words, the panel assembly may be rotated such that the panel assembly is substantially parallel with the longitudinal axis $L_1$ and faces to the right of the page in FIG. 4A and such that the panel assembly is substantially parallel with the longitudinal axis $L_1$ and faces to the left of the page in FIG. 4C. In other embodiments the solar array row 102 may position the panel assemblies in any orientation that enables the solar array row 102 to function as described herein.

The solar panel assembly 104 in the second orientation of FIG. 4B is oriented approximately parallel with the base and ground level (also referred to herein as a "stowed position" and/or "flat stow") and is substantially perpendicular to the longitudinal axis $L_1$. As a result, when in the stowed position, the panel assembly is also generally oriented in line with wind flow over the solar array row 102, thereby reducing drag and external forces on the solar array row 102.

During operation, the solar array row 102 may be selectively controlled to move the solar panel assemblies 104 into the stowed position in response to determining that a detected wind speed exceeds a predetermined threshold. In other embodiments, such as, for example, where the support column 116 is oriented obliquely to a ground surface or where the ground surface is substantially inclined, the solar panel assembly 104 may be oriented obliquely to the longitudinal axis $L_1$ and substantially parallel to the ground surface in the stowed position. In some embodiments, the row controller controls the solar array row 102 to move the panels into the stowed position in response to predetermined event. The control system is operable to determine an orientation of the panel assemblies and/or the solar array row 102. In particular, the control system determines that the assemblies are in the stowed position when they are within a +/−10-degree tolerance from the second orientation (i.e., perpendicular to the longitudinal axis $L_1$) such that the first orientation, the second orientation, and the third orientation all fall within the acceptable tolerance range of the stowed position.

The locking assembly 126 of FIG. 4B is configured to restrict movement of, or "lock", the torque tube 112 in response to external loads applied to the solar array row 102 (FIG. 1). Locking the torque tube 112 by the locking assembly 126 reduces twisting of the torque tube 112 and prevents the panels 104 from twisting or drifting out of the flat stow orientation. For example, during operation, the solar array row 102 may be subject to varying loads resulting from wind flow, precipitation, and other external forces surrounding the solar array row 102. As described in greater detail below, the locking assembly 126 is a hydraulic locking assembly that contains a fluid which is driven by and flows in response to movement of the shaft 136 (shown in FIG. 4B) which corresponds to rotation of the torque tube 112. As such, the faster rotation of the torque tube 112 translates into higher velocity of the fluid flow in the locking assembly 126. Further, because movement of the piston shaft 136 drives fluid, displacement of the fluid is required in order for the torque tube 112 to rotate. The locking assembly 126 includes locking valve assemblies 146, 148 that close off flow paths of the fluid located within the outer tube 134, which restricts movement of the piston shaft 136, thereby locking the torque tube 112. More specifically, the locking assembly 126 closes off flow paths based on velocity of fluid flow in the locking assembly, where a higher velocity flow triggers the locking valve assemblies 146, 148 to lock the torque tube 112. Undesirably fast rotation of the torque tube 112, and therefore high velocity flow in the locking assembly 126, may result from, for example, external forces acting on the solar panels 104.

As the panel assembly is moved between the first orientation and the third orientation, the piston shaft 136 is retracted into the outer tube 134 of the locking assembly 126. In particular, when the panel assembly is in the first orientation of FIG. 4A, the first end 128 of the locking assembly 126 is positioned longitudinally above the torque tube 112. When the panel assembly is in the second orientation, the first end 128 of the locking assembly 126 is positioned substantially in longitudinal alignment with the torque tube 112. When the locking assembly 126 is in the third orientation, the first end 128 of the locking assembly 126 is positioned longitudinally below the torque tube 112.

Figure 5:
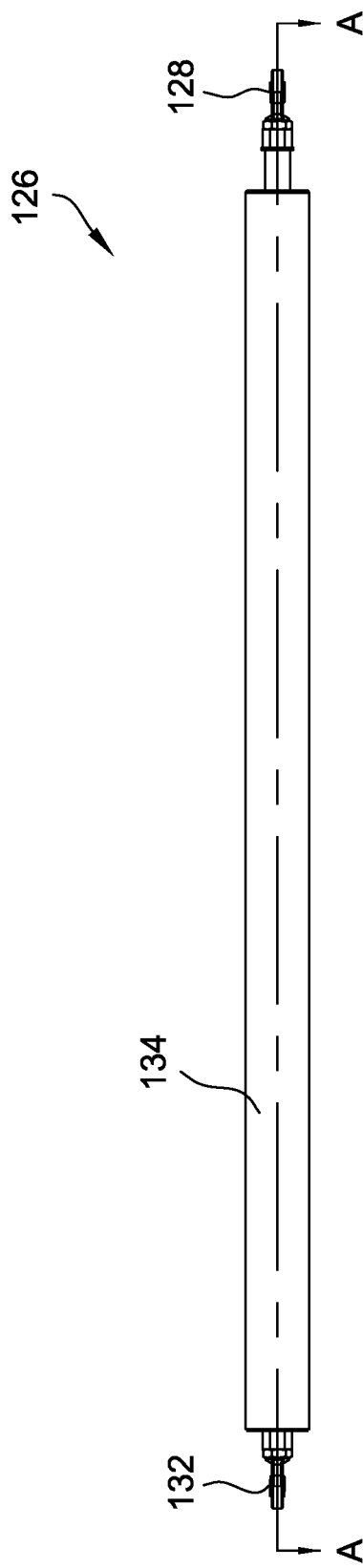
FIG. 5 is a side view of a passive locking assembly of the mounting assembly shown in FIG. 3.
Figure 6:
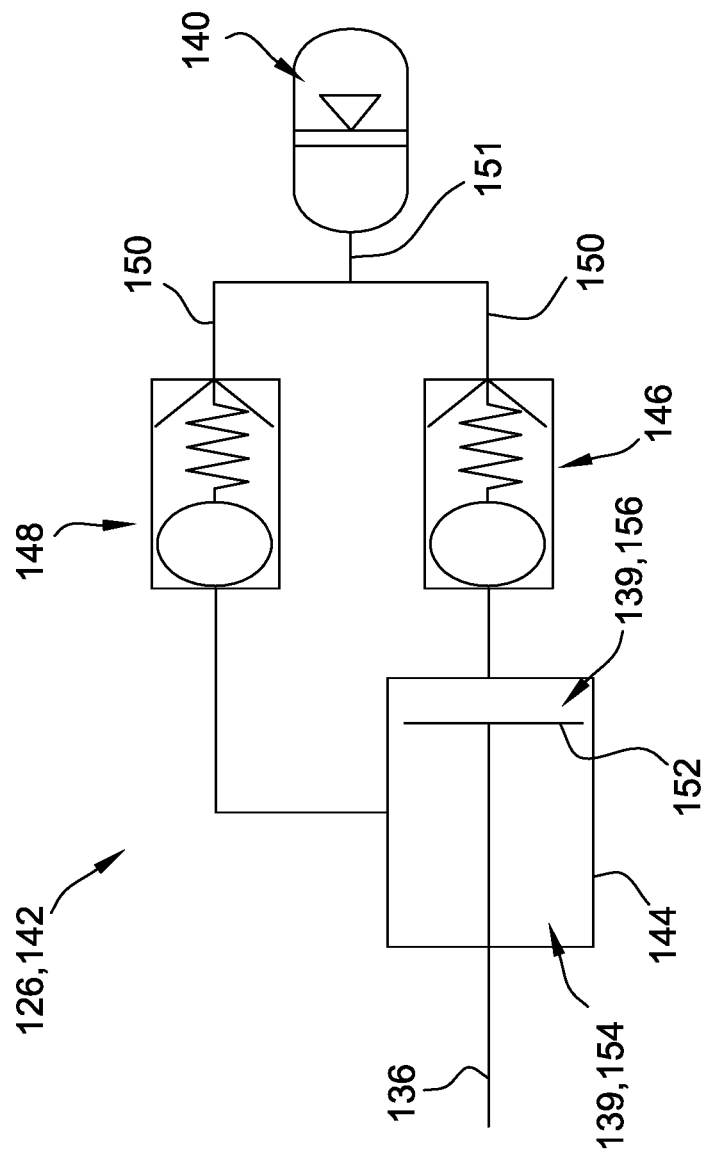
FIG. 6 is a hydraulic schematic of the passive locking assembly of FIG. 5.

FIG. 5 is a top view of the locking assembly 126 shown in FIG. 3. FIG. 6 is a hydraulic schematic of the locking assembly 126.

Referring to FIG. 6, the locking assembly 126 is a hydraulic cylinder and contains fluid therein that resists movement of the piston 152. The locking assembly 126 includes a fluid circuit 142 defined by an inner tube 144 or "inner shell", a first locking valve assembly 146 (also referred to herein as a "compression locking valve assembly"), a second locking valve assembly 148 (also referred to herein as an "extension locking valve assembly"), an accumulator assembly 140, and a displacement fluid path 150 connecting the outlet of each of the compression locking valve assembly 146 and the extension locking valve assembly 148 with an accumulator flow path 151 which directs excess fluid toward the accumulator 140.

The inner tube 144 defines a fluid chamber 139 in which the piston received. The fluid chamber 139 and the displacement flow path 150 are in fluid communication by the compression locking valve assembly 146 and the extension locking valve assembly 148. The fluid circuit 142 is configured for bidirectional (e.g., clockwise and counterclockwise in FIG. 6) flow of fluid therethrough. The fluid used with the locking assembly 126 of FIG. 6 is a synthetic ester, though in other embodiments any suitable fluid may be used. In other embodiments, the locking assembly 126 does not include an accumulator 140.

The piston 152 is received within the inner tube 144 and includes a seal 186 (FIG. 8) that seals against an interior wall 153 of the inner tube 144 to inhibit fluid flow therethrough. The piston 152 and inner tube 144 cooperatively define a compression portion 156 of the fluid chamber 139 and an extension portion 154 of the fluid chamber 139. As the piston 152 is moved within the inner tube 144, the piston 152 causes fluid to be displaced within the primary fluid circuit 142. For example, as the piston shaft 136 is extended out of the inner tube 144, fluid in the extension portion 154 of the fluid chamber 139 is directed out of the inner tube 144 through the extension locking valve assembly 148 and into the displacement fluid path 150, thereby pushing fluid through compression locking valve assembly 146 and into compression portion 156 of the fluid chamber 139. Likewise, as the piston shaft 136 is retracted into the inner tube 144, the piston 152 pushes fluid in compression portion 156 of the fluid chamber 139 through the compression locking valve assembly 146 into the displacement fluid path 150, thereby pushing fluid through the extension locking valve assembly 148 and into extension portion 154 of the fluid chamber 139, and/or pushing fluid into accumulator flow path 151.

Figure 15:
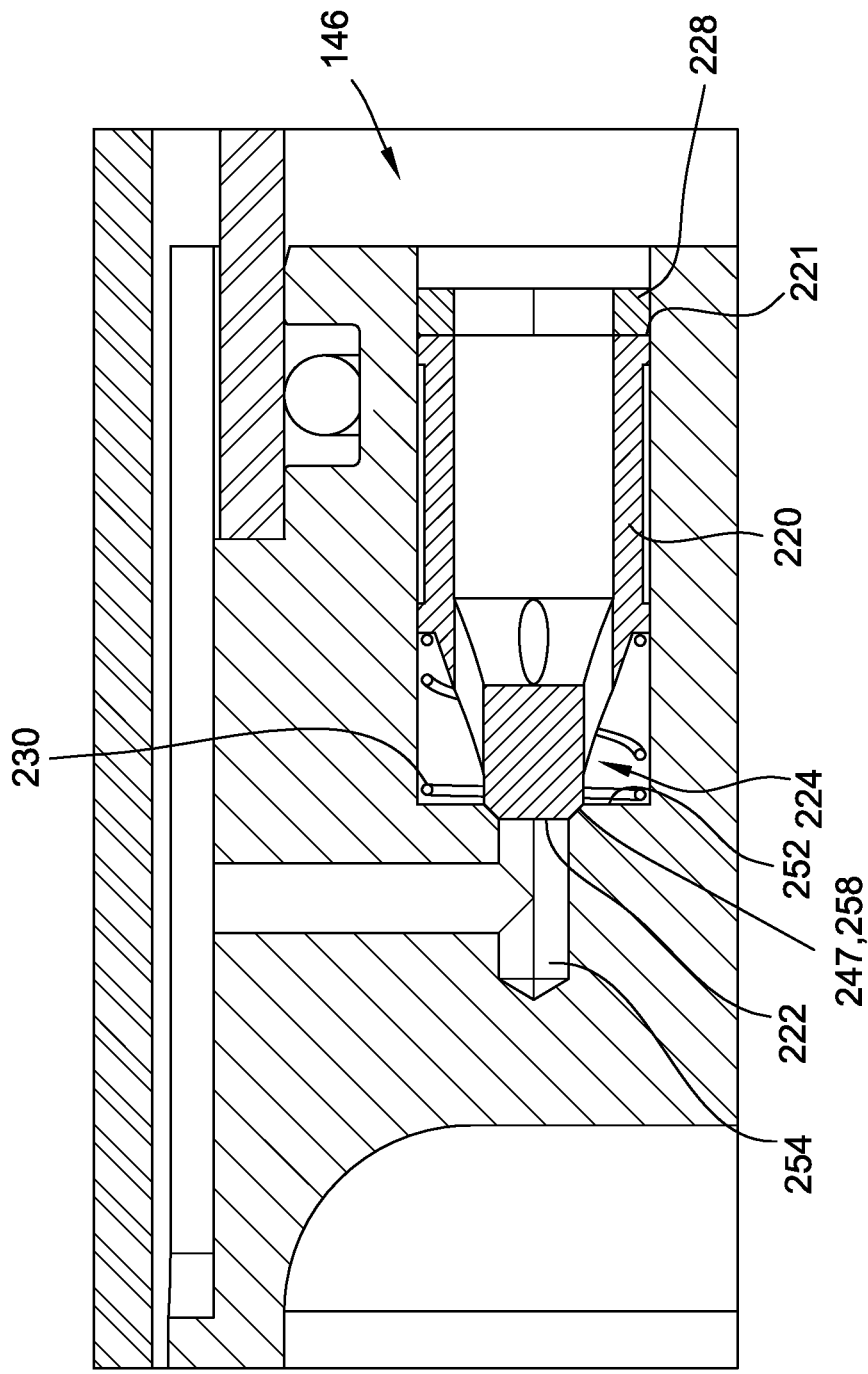
FIG. 15 is an enlarged view of the region B shown in FIG. 8, showing the compression locking valve assembly in a locked state.
Figure 16:
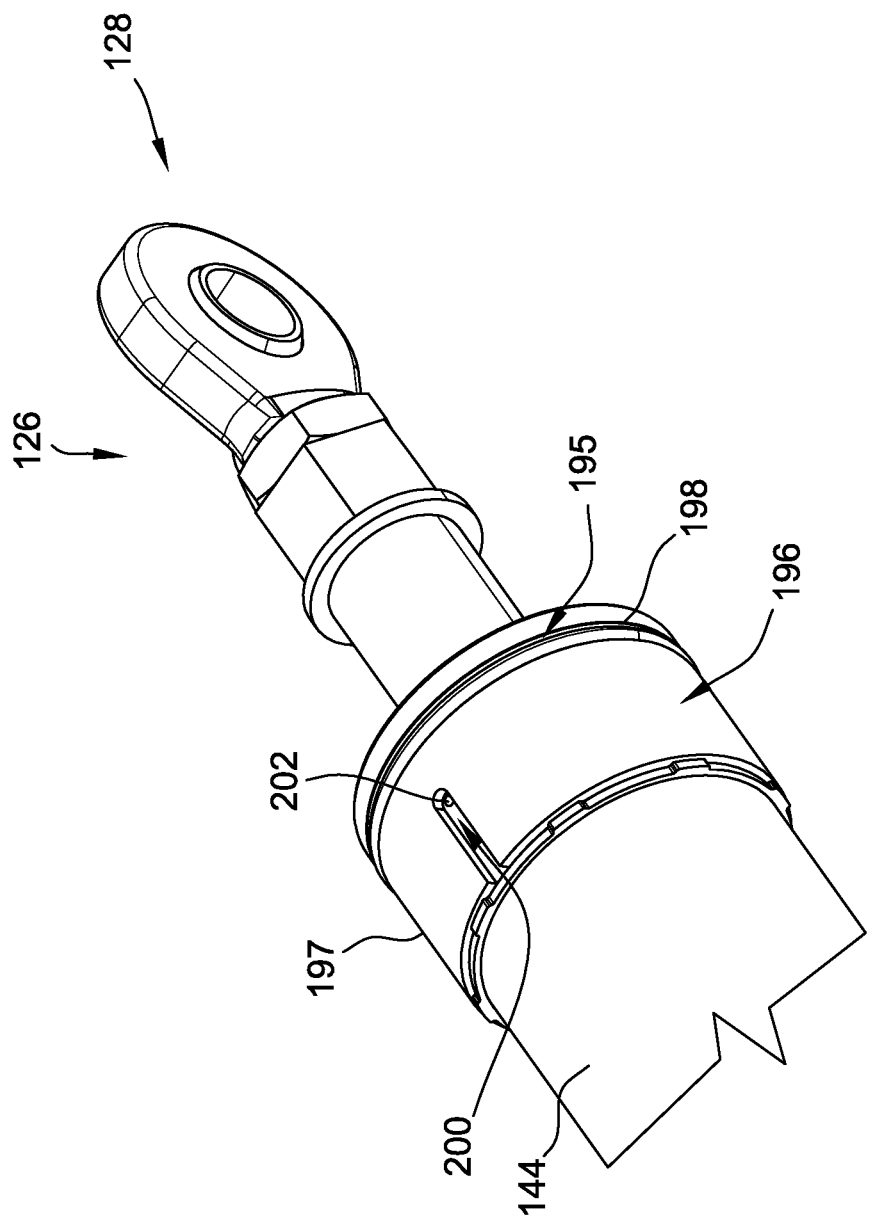
FIG. 16 is an enlarged view of a portion of the passive locking assembly shown in FIG. 10.

The compression locking valve assembly 146 and the extension locking valve assembly 148 of the present embodiment passively restrict movement of the piston 152 in the inner tube 144 (i.e., lock the piston 152) based on forces acting on the piston shaft 136 and the resulting velocity of the piston shaft. In particular, the compression locking valve assembly 146 and the extension locking valve assembly 148 are each passively moveable between an unlocked state (e.g., as shown in FIG. 15), in which fluid is permitted to flow through the valve assemblies 146, 148, and a locked state (e.g., as shown in FIG. 16), in which fluid flow through the valve assemblies 146, 148 is substantially prevented and/or blocked. The assemblies 146, 148 are "passive" in that they transition between the two states in response to forces acting on the locking assembly 126 and are not selectively controlled. When fluid flow through at least one of the valve assemblies 146 is blocked, movement of the shaft 136 within the inner tube 144 is prevented and the shaft 136 provides a locking resistance force on the torque tube 112 (FIG. 3).

The compression locking valve assembly 146 is operable to move to the locked state in response to a threshold velocity of the piston shaft 136 (i.e., moving to the right of the page in FIG. 6). For example, as a compression force acts on the shaft 136, the piston 152 is moved within the inner tube 144 and displaces fluid within the inner tube 144 in the compression portion 156 to flow into the compression locking valve assembly 146. The velocity of the displaced fluid flowing through the compression locking valve assembly 146 increases proportionally with an increase in the velocity of the shaft 136. If the fluid velocity through the compression locking valve assembly 146 exceeds a threshold of the valve assembly 146, the valve assembly 146 passively transitions to a locked state, thereby cutting off fluid circulation through the fluid circuit 142 and locking the shaft 136. In the locked state, the compression locking valve assembly 146 provides a locking force that restricts rotation of the torque tube 112 in a first rotational direction, such as the counter-clockwise direction shown in FIGS. 4A-4C. As compressive force is maintained above a threshold on the shaft 136 in the locked state, the resulting fluid force on the compression locking valve assembly 146 maintains the valve assembly 146 in the locked state. When the compression force acting on the shaft 136 falls below the threshold force, the compression locking valve assembly transitions to the unlocked state and the shaft 136 is unlocked.

The extension locking valve assembly 148 is operable to transition to the locked state in response to a threshold extension velocity and/or tension velocity (terms used interchangeably herein) of the piston shaft 136 (i.e., to the left of the page in FIG. 6). For example, as a tension force acts on the shaft 136, the piston 152 is moved within the inner tube 144 and displaces fluid on in the extension portion 154 to flow into the extension locking valve assembly 148. The velocity of the displaced fluid flowing through the extension locking valve assembly 148 increases proportionally with an increase in the velocity of the shaft 136. If the fluid velocity through the extension locking valve assembly 148 exceeds a threshold of the valve assembly 148, the valve assembly 148 transitions to the locked state, thereby cutting off fluid circulation through the fluid circuit 142 and locking the shaft 136. In the locked state, the extension locking valve assembly 148 provides a locking force that restricts rotation of the torque tube 112 in a second rotational direction, such as the clockwise direction shown in FIGS. 4A-4C. As tensile force is maintained above a certain threshold on the shaft 136 in the locked state, the resulting fluid force on the extension locking valve assembly 148 maintains the valve assembly 148 in the locked state. When the tension force acting on the shaft 136 falls below the threshold force, the extension locking valve assembly transitions to the unlocked state and the shaft 136 is unlocked. In the example embodiment, the compression locking valve assembly 146 and the extension locking valve assembly 148 are each moved into the locked state when the respective fluid forces on the valve assemblies 146, 148 are greater than or equal to approximately 0.001 pounds of force ("lbf") or approximately 0.00445 Newtons. In other embodiments, the valve assemblies 146, 148 may be configured to transition to the locked state in response to any threshold fluid force.

Figure 7:
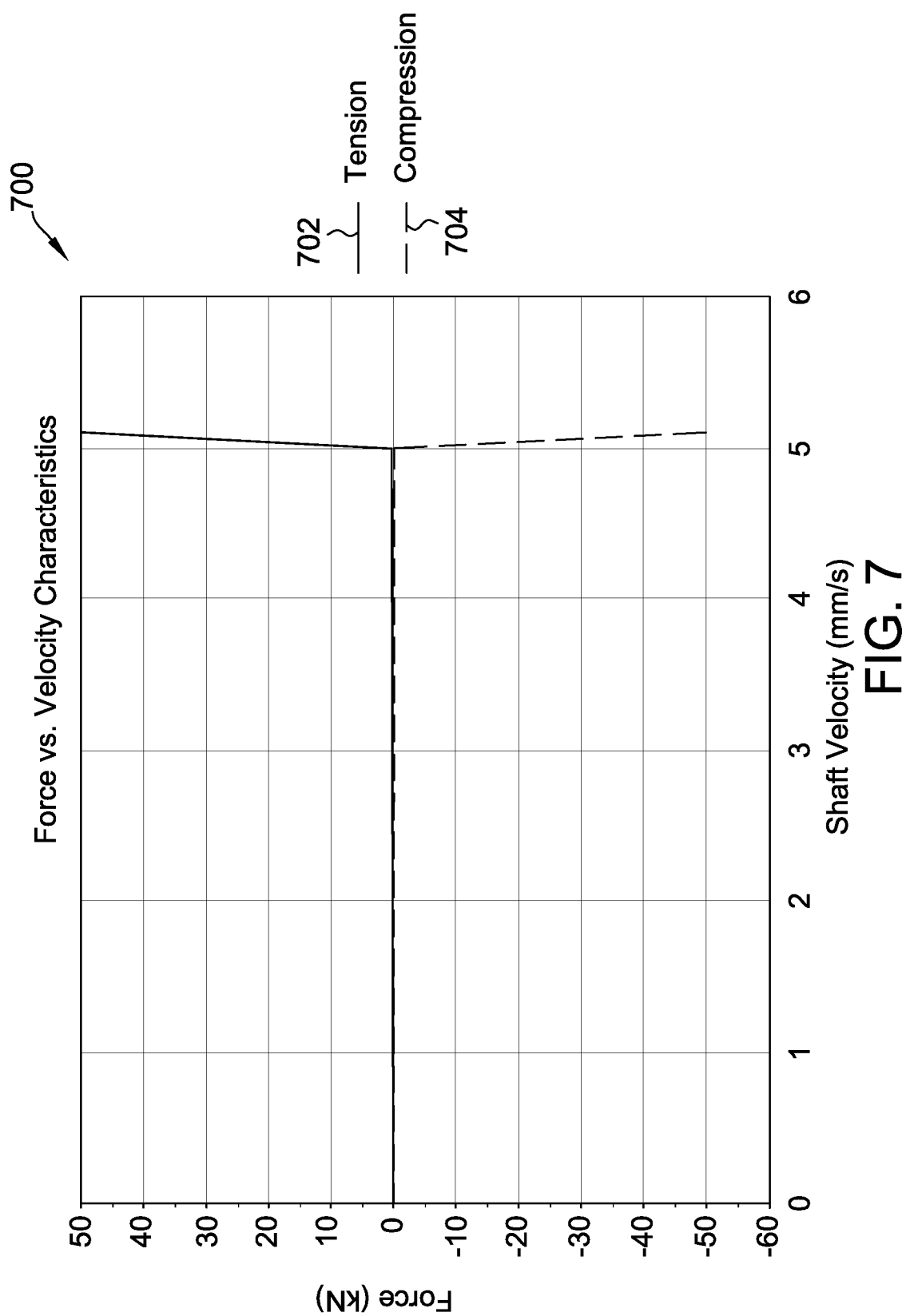
FIG. 7 is a chart showing resistance force characteristics of the passive locking assembly of FIG. 5.

FIG. 7 is a chart 700 showing the resistance force of the passive locking assembly 126 in response to velocity of the piston shaft 136. A first line 702 shows the resistance force of the assembly 126 in tension and a second line 704 shows a resistance force of the assembly in compression. In the example embodiment, the threshold shaft velocity is approximately 5 millimeters per second (mm/s) in both tension and compression. Thus, as the shaft is moved between 0 mm/s and 5 mm/s the passive locking assembly 126 provides a negligible resistance force on the torque tube 112 (FIG. 3). As the piston shaft 136 moves faster than 5 mm/s in compression, the compression locking valve assembly 146 transitions to the locked state and the passive locking assembly 126 provides a resistance force of approximately −50 kilonewtons on the torque tube 112. Likewise, as the piston shaft moves faster than 5 mm/s in tension, the extension locking valve assembly 148 transitions to the locked state and the passive locking assembly 126 applies a resistance force of approximately 50 kilonewtons on the torque tube 112.

In other embodiments, the passive locking assembly 126 may be configured to lock based on any suitable threshold shaft velocity. For example, and as described in greater detail below, the threshold shaft velocity at which the locking valve assemblies 146, 148 move to the locked state is at least partially based on the geometry and material properties of the valve assemblies 146, 148 and the valve assemblies may be configured differently in alternative embodiments to vary their respective locking thresholds. For example, in some embodiments, the threshold shaft velocity at which the valve assemblies transition to the locked state may be in the range of 0.75 mm/s to 40 mm/s, 1.5 mm/s to 20 mm/s, and/or 3 mm/s to 10 mm/s. Moreover, although the locking valve assemblies 146, 148 described herein are each configured to lock in response to the same threshold shaft velocity, in other embodiments, the locking valve assemblies 146, 148 may have different threshold locking velocities.

Referring back to FIG. 6, the accumulator 140 is connected in flow communication with the displacement flow path 150 by an accumulator flow path 151 to receive and contain excess fluid from the displacement flow path 150 and fluid chamber 139. For example, during operation, when the piston 152 is fully extended from the tube, the displacement flow path 150 and fluid chamber 139 contain a first volume of fluid. As the piston 152 is retracted into the inner tube 144 (e.g., as a result of pivoting the solar panel assemblies 104 on the torque tube 112), at least a portion of the first volume of fluid is displaced from the fluid chamber 139 and the displacement flow path 150 to receive the added volume of the retracted piston 152. The accumulator 140 provides a reservoir for excess fluid that is displaced by the added volume of the piston 152 in the inner tube 144. In other embodiments, the locking assembly 126 does not include the accumulator 140 or the accumulator flow path 151.

Figure 8:
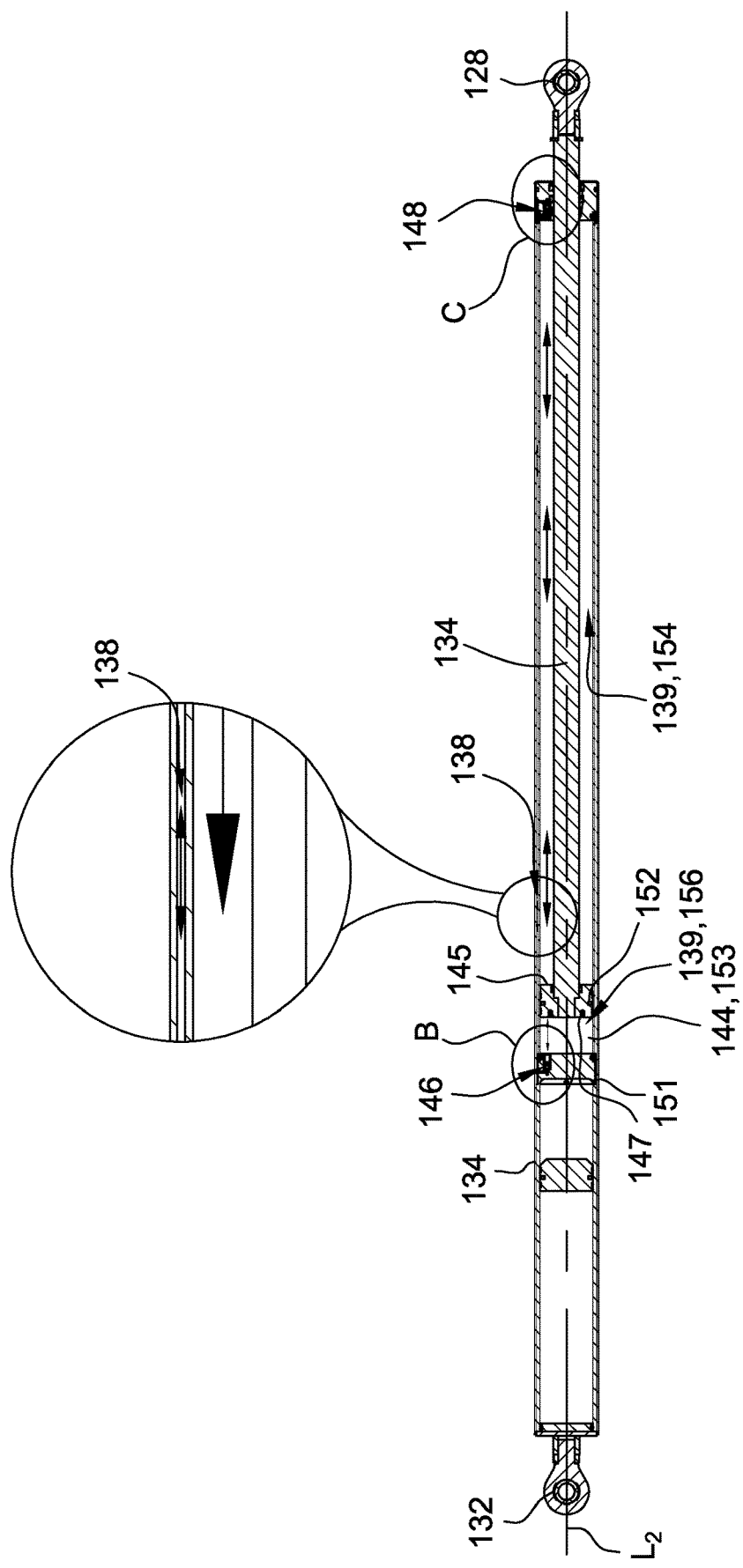
FIG. 8 is a section view of the passive locking assembly of FIG. 5 taken along the line A-A of FIG. 5.

FIG. 8 is a cross sectional view of the locking assembly 126 taken along the line A-A shown in FIG. 5. Flow lines, as used throughout the figures, indicate fluid flow through the locking assembly 126.

The locking assembly 126 defines a longitudinal axis $L_2$ extending through the first end 128 and the second end 132. The outer tube 134 circumscribes the inner tube 144 and defines an outer fluid channel 138 extending radially between the outer tube 134 and the inner tube 144. The outer fluid channel 138 defines a portion of the displacement flow path 150, as shown and described with respect to FIG. 6. The piston 152 is moveable within the inner tube 144 in a direction parallel to the longitudinal axis $L_2$ (i.e., "longitudinally" or "axially", as used herein).

The piston 152 extends between a first axial end 145 oriented to face the first end 128 of the locking assembly 126, and a second axial end 147 oriented to face the second end 132. The piston 152 of FIG. 8 is shown partially retracted within the inner tube 144. During operation, extension of the piston 152 from the inner tube 144 (e.g., to the right of the page as shown in FIG. 8) causes the piston 152 to move relative to the inner tube 144 and displaces a first portion of fluid in the extension portion 154 of fluid chamber 139 towards the first end 128. Fluid in the outer fluid channel 138 is caused to be displaced towards the second end 132. When the piston 152 is retracted into the inner tube 144 from an extended position (i.e., moved to the left of the page in FIG. 7), a second portion of fluid in the compression portion 156 of fluid chamber 139 is displaced towards the second end 132 and through the compression locking valve assembly 146 to the outer fluid channel 138. Fluid in the outer fluid channel 138 is displaced toward the first end 128, through the extension locking valve assembly 148, and into the fluid chamber 139.

Figure 9:
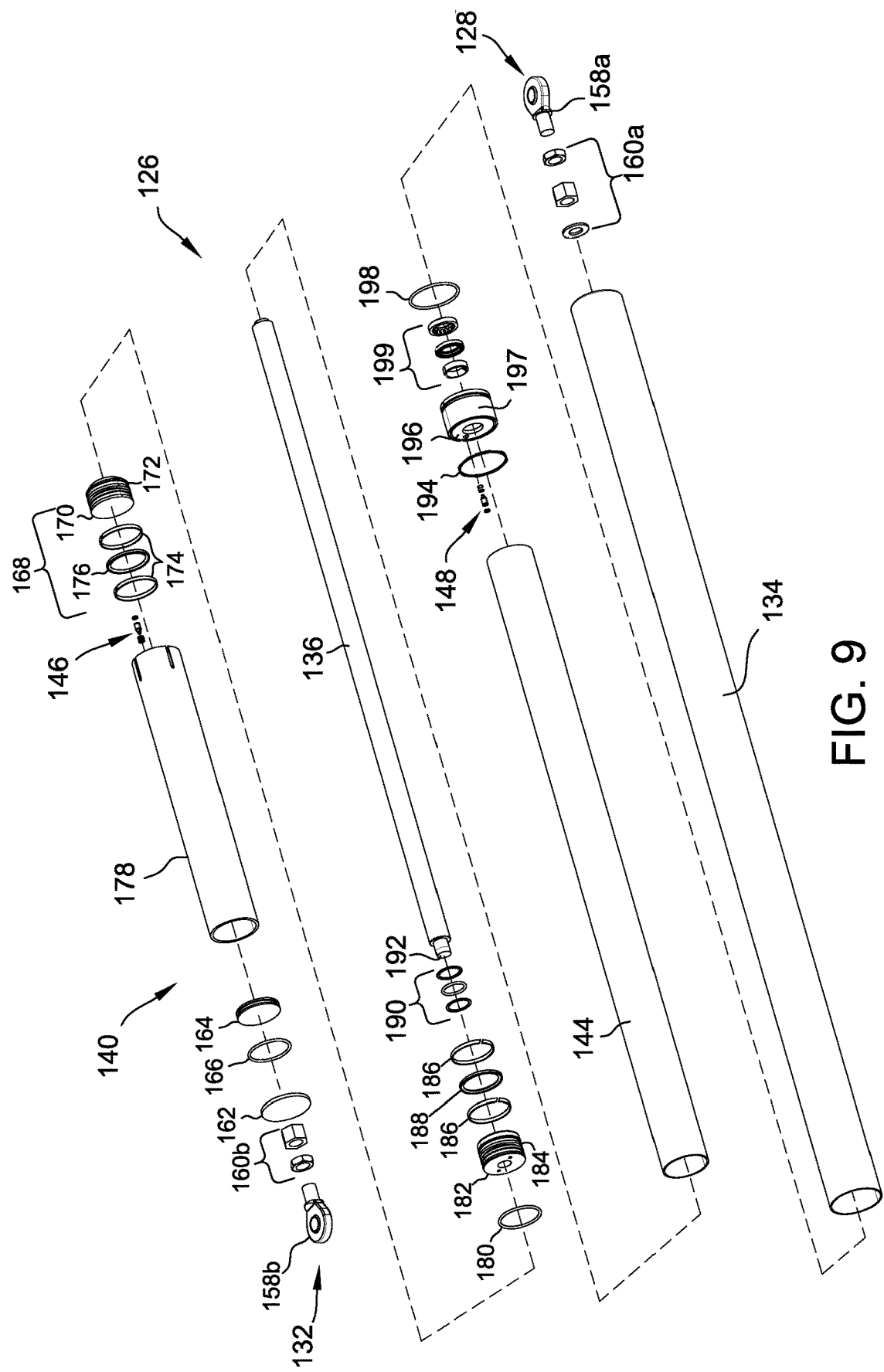
FIG. 9 is an exploded view of the passive locking assembly of FIG. 5.

FIG. 9 is an exploded view of the locking assembly 126. The first and second ends 128, 132 each include joints 158a, 158b which facilitate pivotably coupling the locking assembly 126 to the linkage and the support column 116 (FIG. 3). In the embodiment of FIG. 9, the joints 158 are ball joints 158, though other joints 158 may be used in other embodiments. Fastening assemblies 160a, 160b are provided at the ends 128, 132 for securing the respective joints 158a, 158b. In particular, a first fastening assembly 160a at first end 128 secures the first joint 158a to the piston shaft 136. The second fastening assembly 160b is provided at the second end 132 which secures the second joint 158b to a second end cap 162.

The piston shaft 136 extends through the inner tube 144, the outer tube 134 and a first end cap 196. The end cap 196 attaches to inner tube 144 and provides a closure at the first end 128 of the locking assembly. The shaft seal assembly 199 includes a group of seals that seal first end cap 196 to prevent fluid from leaking through a shaft slot 205 (FIG. 17) of the first end cap 196 as the shaft 136 is moved through the shaft slot 205 during use.

The locking assembly 126 further includes the outer tube 134, the first end cap seal assembly 194, the extension locking valve assembly 148, the inner tube 144, the shaft 136, the piston assembly 152, the compression locking valve assembly 146, an end tube 178, and an accumulator piston assembly 168, an accumulator cap 164, and O-rings 166, 180. The piston assembly 152 includes a piston body 182, piston seal bearings 186, a piston seal ring 188, and gaskets 190. The shaft 136 includes a piston end 192 that extends through and attaches to the piston body 182. The gaskets 190 provide a seal between the shaft 136 and the piston body 182. The piston seal bearings 186 and the piston seal ring 188 attach to an outer surface 184 of the piston body 182 and seal against the inner tube 144.

The accumulator piston assembly 168 includes an accumulator piston 170, piston seal bearings 174, and a piston seal ring 176. The piston seal bearings 174 and piston seal ring 176 attach to an outer surface 172 of the accumulator piston 170 and seal against an accumulator tube 165 (FIG. 19) positioned within the end tube 178. An accumulator cap 164 and O-ring 166 cover and seal off the end tube 178 from the second end cap 162.

Figure 10:
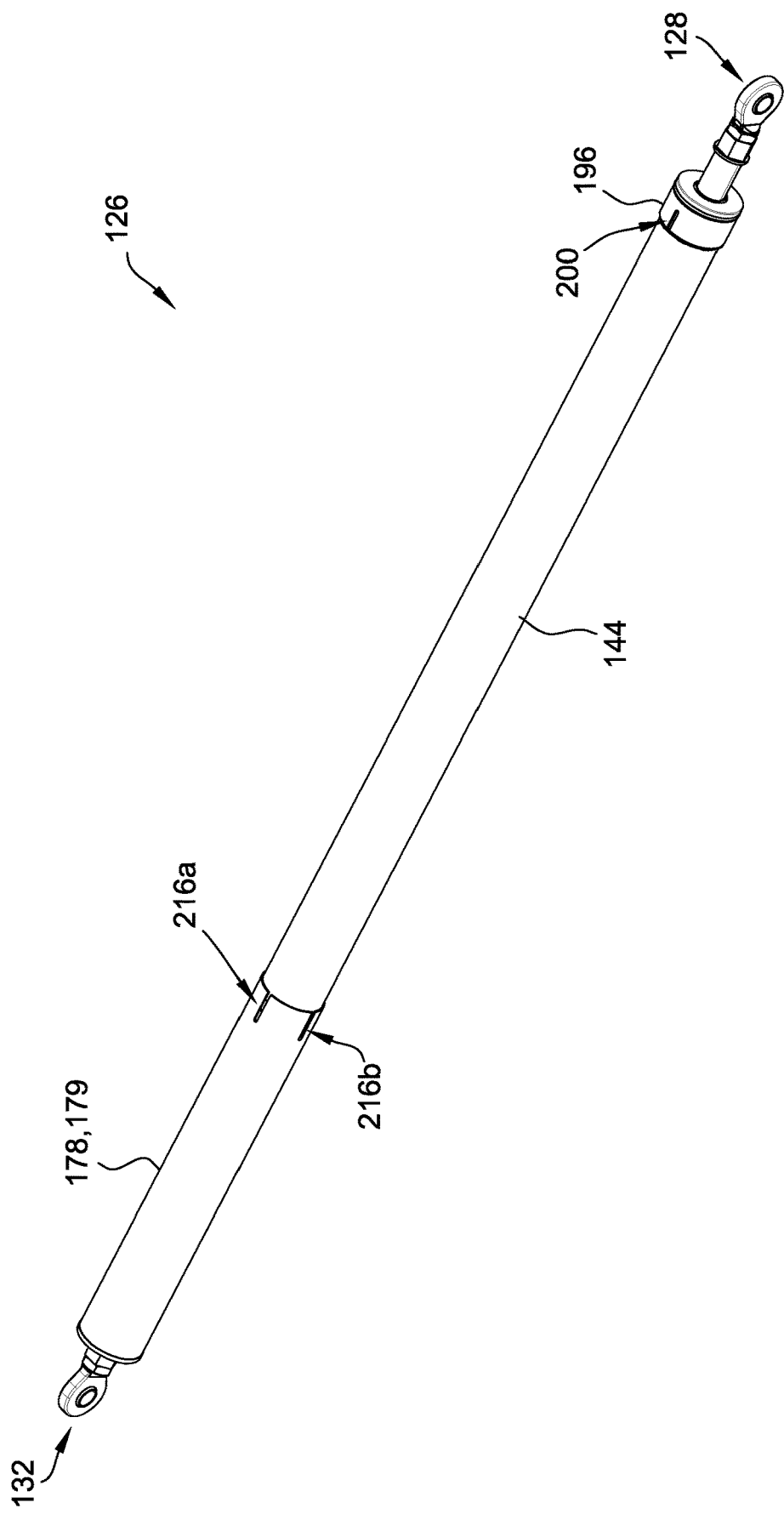
FIG. 10 is a perspective view of the passive locking assembly of FIG. 5 with portions removed to reveal internal construction.
Figure 11:
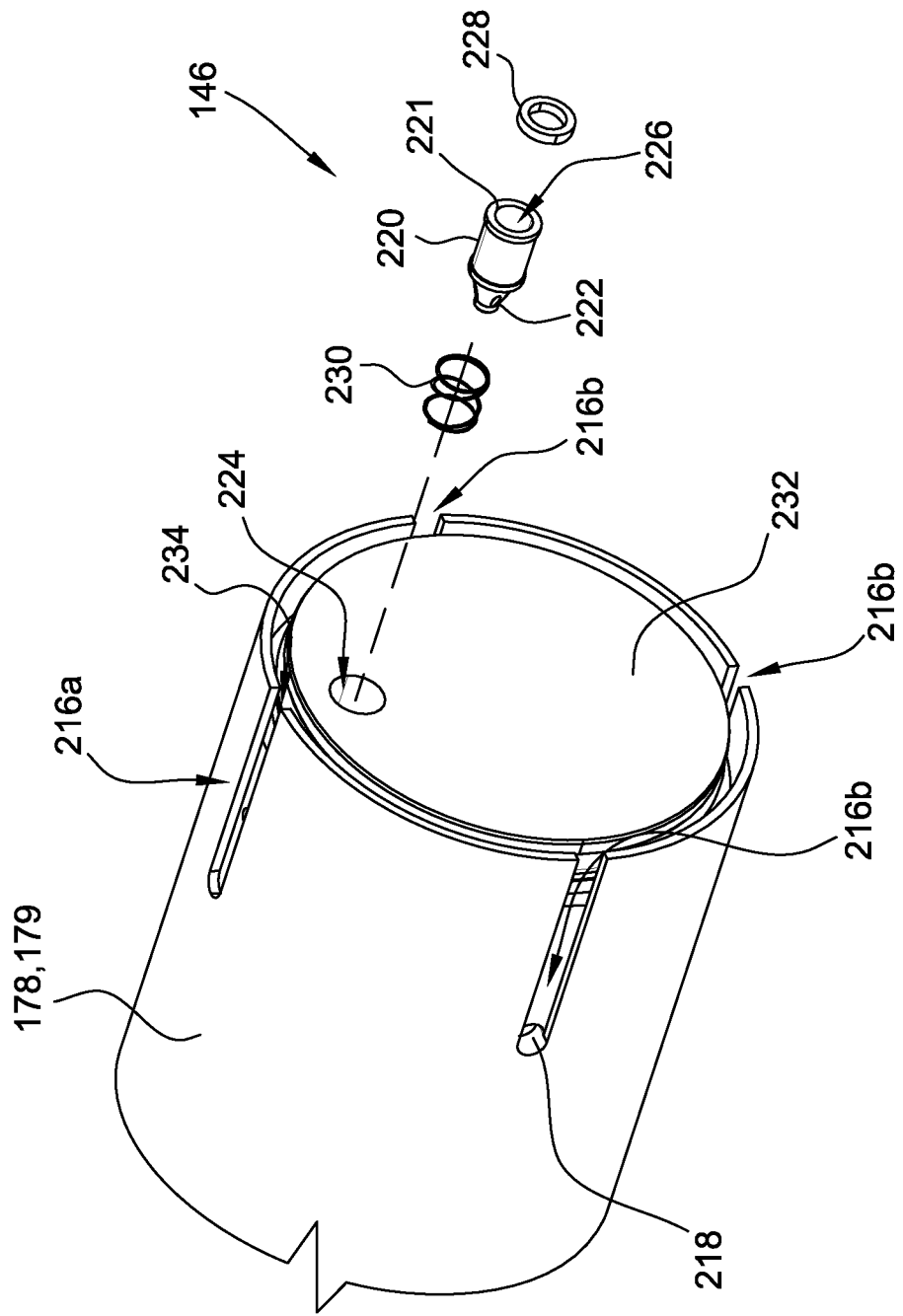
FIG. 11 is an exploded view of a compression locking valve assembly and an end tube included in the passive locking assembly of FIG. 5.

FIG. 10 shows the passive locking assembly 126 with the outer tube 134 removed. FIG. 11 shows an exploded view of a portion of the end tube 178 and the compression locking valve assembly 146.

Referring to FIG. 10, the inner tube 144 extends from the end tube 178 to the first end cap 196. In particular, the inner tube 144 is received within the end tube 178 and the first end cap 196, which retain the inner tube 144 longitudinally therebetween. Referring to FIG. 11, the end tube 178 includes an outer surface 179 and defines a plurality of longitudinally extending channels 216a, 216b radially recessed from the outer surface 179. The longitudinal channels 216a and 216b are circumferentially spaced about the outer surface 179 of the end tube 178. As best seen in FIG. 11, the longitudinal channels 216 each define an opening 218. The longitudinal channels 216 include a first longitudinal channel 216a and a plurality of second longitudinal channels 216b. As described in greater detail below, the first longitudinal channel 216a provides flow connection between the outer fluid channel 138 and the compression locking valve assembly 146, and the second longitudinal channels 216b each provide flow connection between the outer fluid channel 138 and the accumulator tube 165.

The end tube 178 of FIG. 11 further includes an end face 232 and a groove axially recessed from the end face 232. The axial groove 234 extends circumferentially around the end face 232 and is sized to receive the inner tube 144 therein. When assembled (e.g., as shown in FIG. 8) end face 232 is oriented to face the piston 152. End face 232 defines a compression valve chamber 224 sized to receive the compression locking valve assembly 146 therein.

The compression locking valve assembly 146 includes a valve body 220, a biasing element 230, and a valve seat 228. The valve body 220 extends between a stopper end 222 and an open end 226. The open end 221 defines a fluid opening 226 for directing fluid flow through the valve body 220. The valve seat 228 attaches to the end tube 178 within the compression valve chamber 224 to retain the valve body 220 within the chamber 224. In particular, the compression locking valve assembly 146 is a velocity check valve operable to passively move the valve body 220 between an unlocked position and a locked position based on the velocity of fluid flowing through the assembly 146. When the valve body 220 is in the unlocked position the assembly 146 is in the unlocked state. When the valve body 220 in the locked position the assembly 146 is in the locked state.

Figure 12:
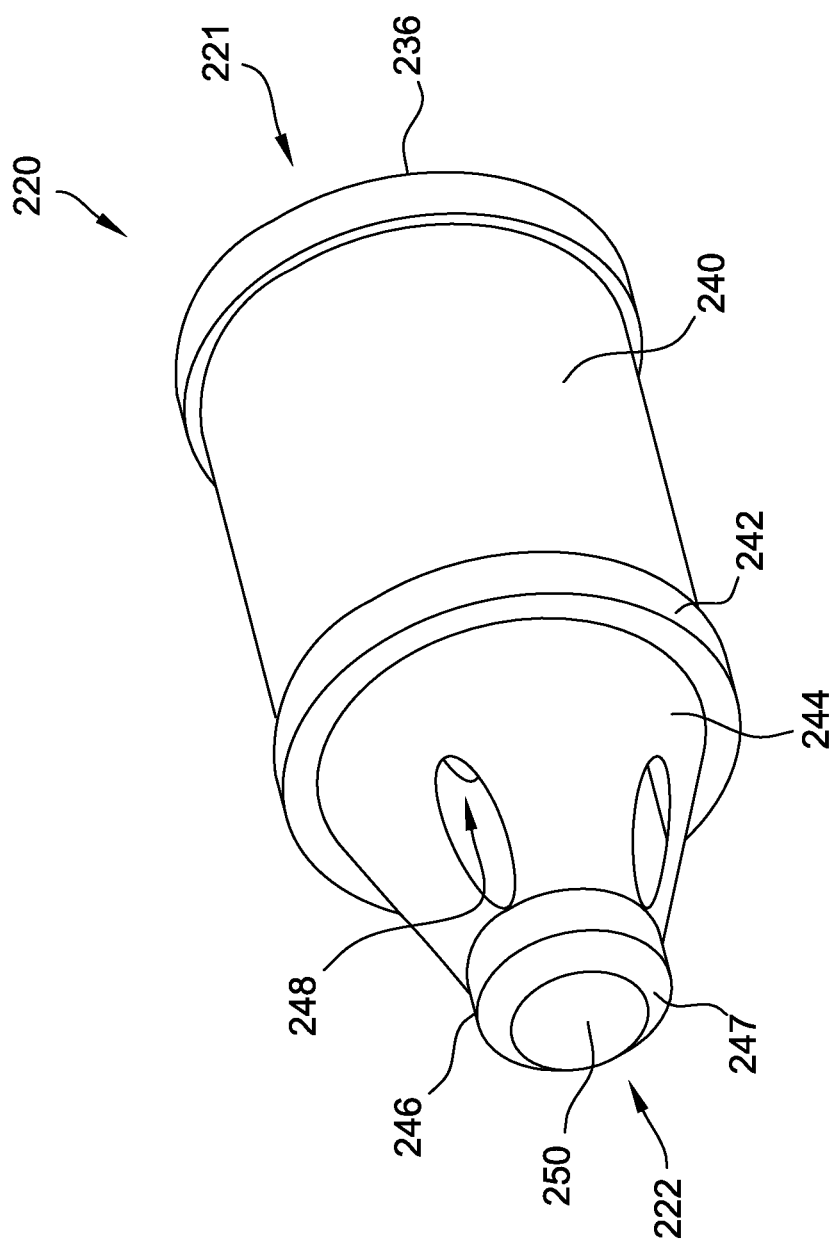
FIG. 12 is a perspective view of a valve body of the compression locking valve assembly shown in FIG. 11.

FIG. 12 is a perspective view of the valve body 12. The valve body 220 includes a first rib 236 at the open end 221 and a cylindrical outer surface 240 extending axially from the first rib 236 to a second rib 242. The cylindrical outer surface 240 is radially recessed relative to the first and second ribs 236, 242. A first tapered wall 244 extends axially from the second rib 242 to a stopper wall 246. The first tapered wall 244 defines a plurality of ports 248 extending therethrough. The ports 248 are in fluid communication with the fluid opening 226 (FIG. 11) at the open end 221 of the valve body 220. The stopper wall 246 extends from the first tapered wall 244 to a second tapered wall 247, which tapers inwardly to an end wall 250 at the stopper end 222. The valve body is made of a material having a high material strength to withstand high fluid pressures acting on the valve body during operation. In particular, in the example embodiment, the valve is made of metal and is rated to withstand fluid pressures of up to 3000 pounds per square inch (or about 20,685 Kilopascal).

Figure 13:
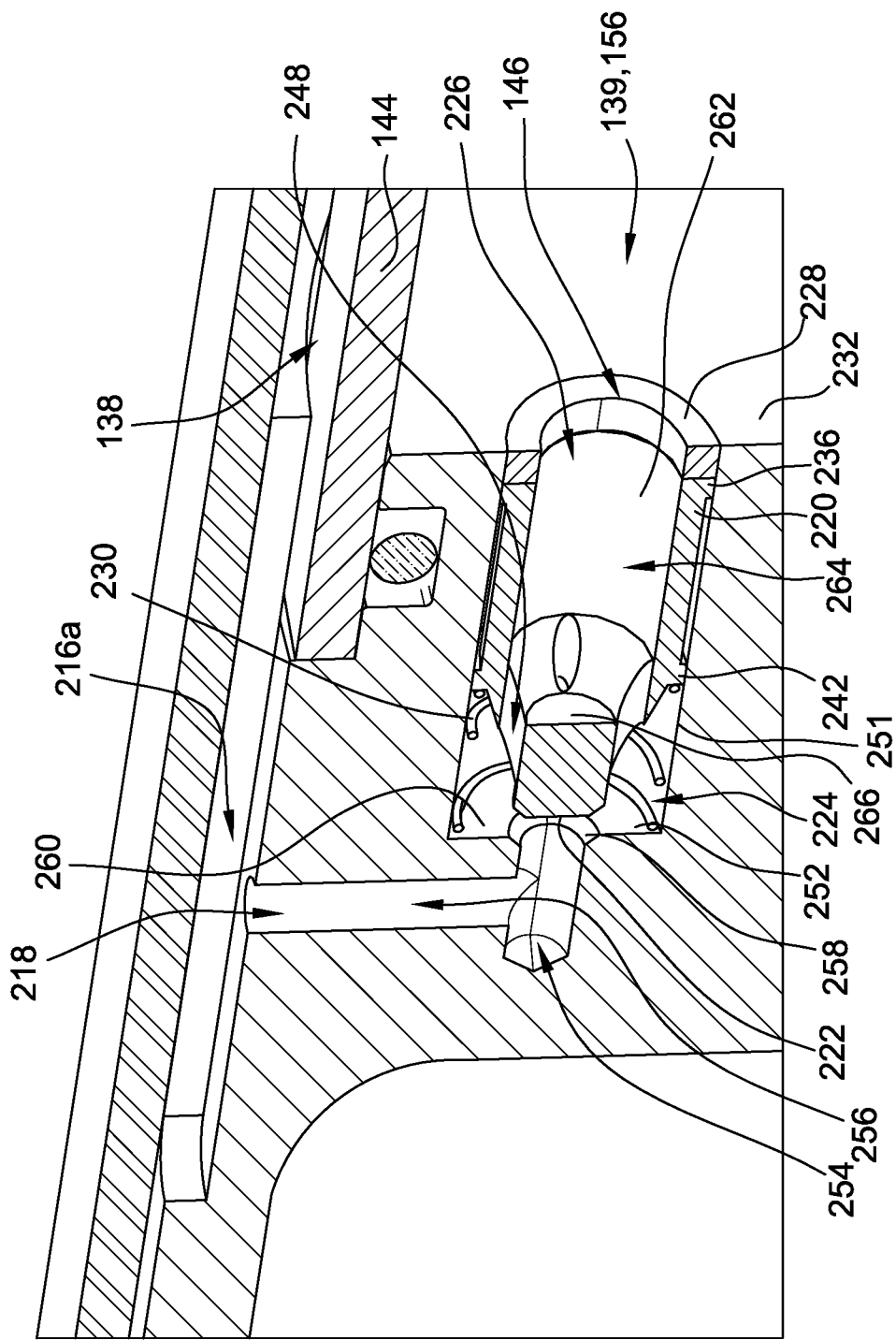
FIG. 13 is an enlarged perspective view of the region B shown in FIG. 8.
Figure 14:
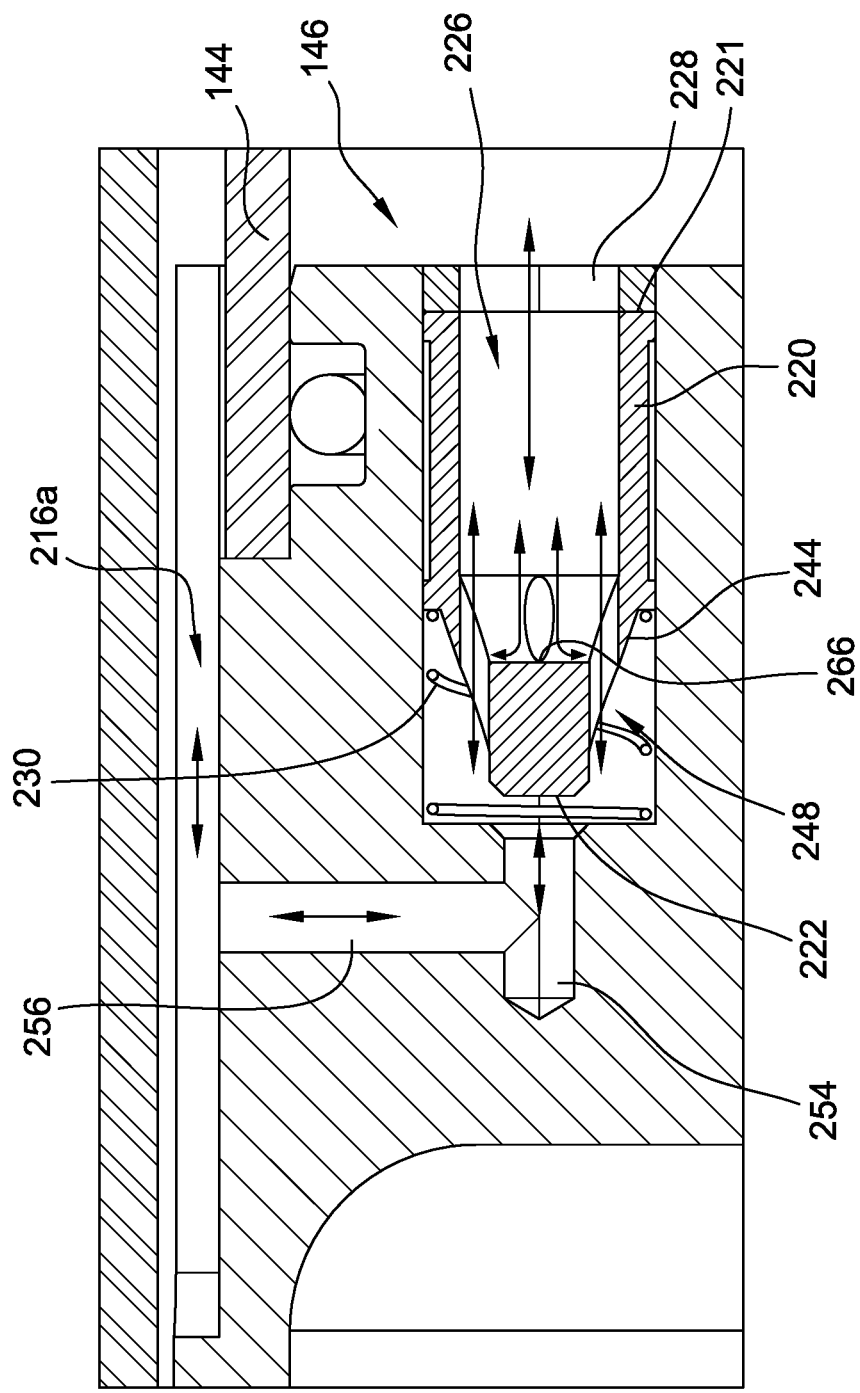
FIG. 14 is an enlarged view of the region B shown in FIG. 8, showing a fluid flow through the compression locking valve assembly in an unlocked state.

FIG. 13 is an enlarged perspective view of the region B, shown in FIG. 8, showing the compression locking valve assembly 146. FIG. 14 shows fluid flow through the compression locking valve assembly 146 in the unlocked state. FIG. 15 shows the compression locking valve assembly 146 in the locked state.

Referring to FIG. 13, the end tube 178 includes a chamber sidewall 251 and a chamber end wall 252 that collectively define the compression valve chamber 224. The ribs 236, 242 of the valve body 220 contact the sidewall 251 to secure the valve body 220 within the chamber 224 and prevent fluid flow radially between the valve body 220 and the sidewall 251. The chamber end wall 252 defines a longitudinal chamber passage 254 that extends through the chamber end wall 252 and to a radial channel 256. The radial channel 256 extends from the chamber passage 254 to the opening 218 in the longitudinally extending channel 216a, and to the outer fluid channel 138 therefrom. A tapered ledge 258 tapers radially inwardly from an end surface 260 of the end wall 252 to the longitudinal chamber passage 254. In particular, the ledge 258 is tapered in correspondence with the second tapered wall 247 of the valve body 220.

The valve body 220 includes an interior surface 262 defining a valve cavity 264 extending between the open end 226 of the valve body 220 and the ports 248. The valve body 220 further includes a drag surface 266 oriented to provide resistance to fluid flow through the valve body 220. In particular, in the embodiment of FIG. 13, the drag surface 266 is oriented perpendicular to the direction of fluid flow (FIG. 14) through the valve body 220.

The biasing element 230 engages the chamber end wall 252 and the second rib 242 of the valve body 220. The biasing element 230 biases the valve body 220 within the compression valve chamber 224 such that the stopper end 222 is spaced from the chamber passage 254 and the valve body 220, or more specifically, the first rib 236 of the valve body 220 is pressed up against the valve seat 228. In the example embodiment, the biasing element 230 is a compression spring, other suitable biasing elements may be used in other embodiments. In the illustrated embodiment, the biasing element 230 is a linear compression spring having a constant spring rate. In other embodiments, a non-linear biasing element having a variable spring rate may be used to provide a soft opening and/or soft closing of the valve body 220.

Referring to FIG. 14, during operation, with the compression locking valve assembly in the unlocked state, as the shaft 136 (FIG. 8) is retracted into the inner tube 144 fluid flow is directed through the valve seat 228 and the open end 221 of the valve body and into the valve cavity 264. From the valve cavity 264, fluid is directed through the ports 248 on the first tapered wall 244 and into the longitudinal chamber passage 254. From the longitudinal chamber passage 254, the fluid is directed through the radial channel 256, into the longitudinal channel 216a, and to the outer fluid channel 138 (FIG. 13) therefrom. Moreover, as the fluid flows through the valve cavity 264 when the piston 152 (FIG. 8) is in compression, at least a portion of the fluid flow through the valve body 220 is deflected by the drag surface 266, thereby exerting a force on the valve body 220 (e.g., in the left direction as shown in FIG. 14). As the fluid pressure acting on the drag surface 266 is increased (e.g., due to an increased piston velocity and/or increased force acting on the shaft 136), the fluid force acting on the valve body 220 is likewise increased. When the shaft 136 velocity exceeds the threshold velocity, the fluid force acting on the valve body 220 is greater than the biasing force acting on the valve body 220 from the biasing element 230. As a result, the valve body 220 is moved into the locked position, as shown in FIG. 15, and compresses the biasing element 230.

Referring to FIG. 15, in the locked position, the valve body 220 is moved longitudinally within the chamber 224 from the unlocked position (e.g., to the left of the page from FIG. 14). In particular, the open end 221 is spaced from the valve seat 228 and the stopper end 222 is moved into the longitudinal chamber passage 254, thereby substantially blocking fluid from flowing between the valve chamber 224 and the longitudinal passage 254. Moreover, in the locked position, the second tapered wall 247 is aligned with and contacts the tapered ledge 258 to close off any flow path between the valve body 220 and the longitudinal passage 254. In some embodiments, the valve body 220 may include one or more seals (not shown) to provide a sealed fit with the tapered ledge 258, the end wall 252, or any other portion of the chamber 224.

FIG. 16 is an enlarged view of the first end 128 of the passive locking assembly 126 with the outer tube 134 (FIG.

Figure 17:
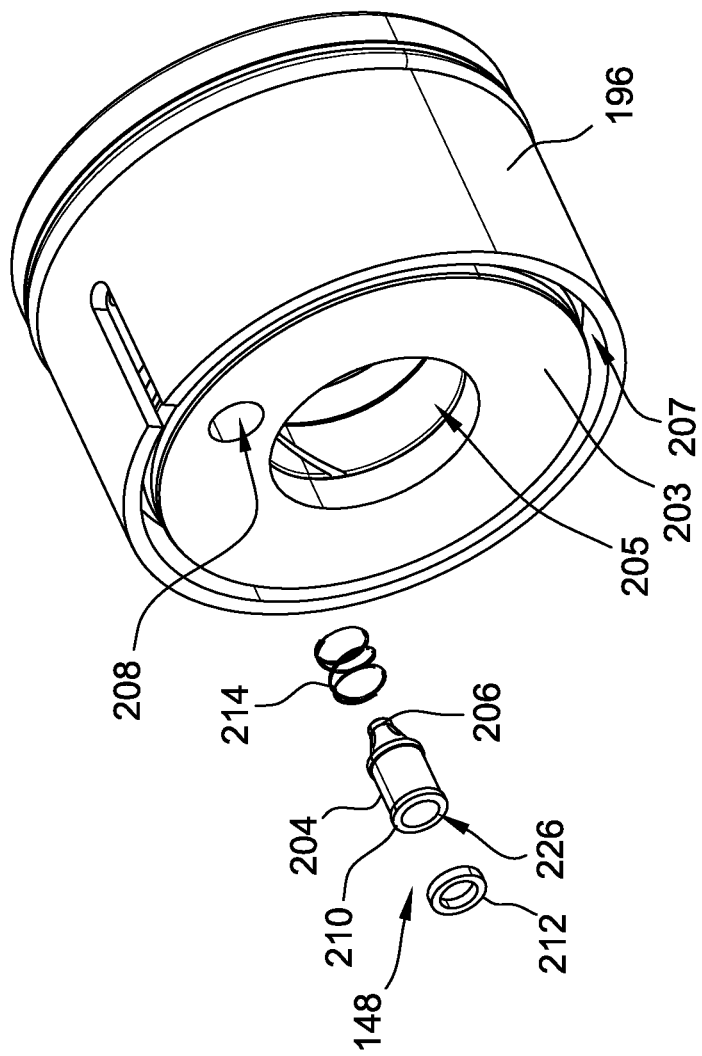
FIG. 17 is an exploded view of an extension locking valve assembly and an end cap included in the passive locking assembly of FIG. 5.
Figure 18:
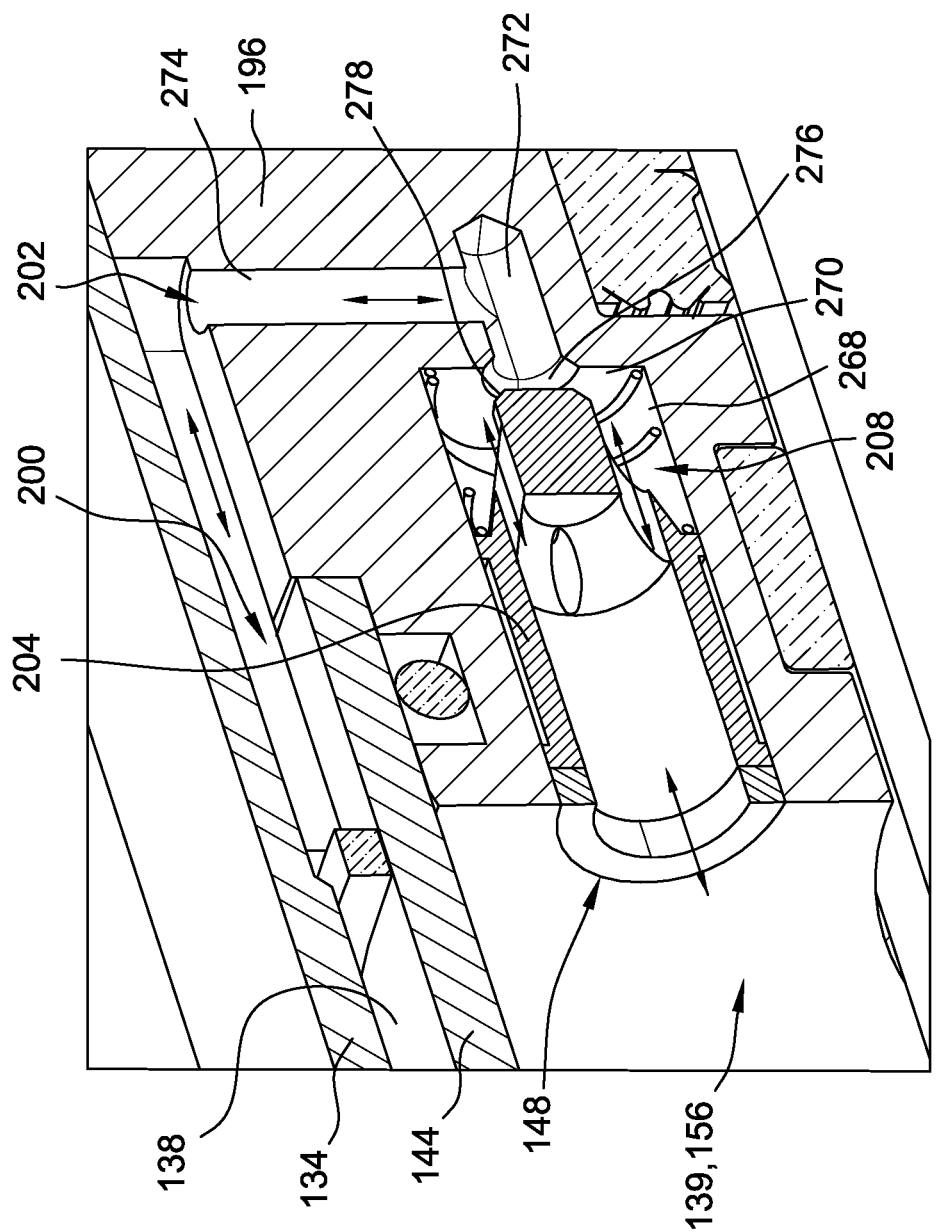
FIG. 18 is an enlarged perspective view of the region C shown in FIG. 8.

8) removed, as shown in FIG. 10. FIG. 17 is an exploded view of the first end cap 196 and the extension locking valve assembly 148. FIG. 18 is an enlarged perspective view of the region C shown in FIG. 8.

Referring to FIG. 16, the inner tube 144 extends into the first end cap 196 at the first end of the locking assembly 126. The first end cap 196 has a cylindrical shape having an outer surface 197 and defining a longitudinally extending channel 200 radially recessed from the outer surface 197. The longitudinal channel 200 defines an opening 202 therein. The first end cap 196 further defines a groove 195 extending circumferentially about the first end cap 196 and recessed relative to the outer surface 197. The cap seal 198 is received within the groove 195.

Referring to FIG. 17, the first end cap 196 further includes an end face 203 and a shaft slot 205 centrally defined in the end face 203. The shaft slot 205 extends through the end cap 196 and is sized to slidably receive the shaft 136 therethrough. An extension valve chamber 208 is defined within the end face 203 radially outwards of the shaft slot 205 and is sized to receive the extension valve assembly 148 therein. A groove 207 is axially recessed from the end face 203 and extends circumferentially around the end face 203. The groove 207 is sized to receive and secure the inner tube 144 therein to retain the inner tube 144 within the outer tube 134 (FIG. 9). When assembled (e.g., as shown in FIG. 8) end face 203 is oriented to face the piston 152.

The extension locking valve assembly 148 includes a valve body 204, a biasing element 214, and a valve seat 212. In the example embodiment, the extension locking valve assembly 148 is substantially identical to the compression locking valve assembly 146, described above with respect to FIGS. 11-15. In particular, the valve body 204 extends between a stopper end 206 and an open end 210. The open end 210 defines a fluid opening 226 for directing fluid flow through the valve body 204. The valve seat 212 attaches to the first end cap 196 within the extension valve chamber 208 to retain the valve body 204 within the chamber 208.

As shown in FIG. 18, in the unlocked position, fluid may flow through the extension locking valve assembly 148 in substantially the same manner as described above with respect to the compression locking valve assembly 146. For example, the first end cap 196 includes a chamber sidewall 268 and a chamber end wall 270 that collectively define the extension valve chamber 208. The chamber end wall 270 defines a longitudinal chamber passage 272 that extends through the chamber end wall 270 within the first end cap 196 and to a radially extending channel 274. The radially extending channel 274 extends from the chamber passage 272, through the opening 202, to the longitudinally extending channel 200, and to the outer fluid channel 138 therefrom. A tapered ledge 276 tapers radially inwardly from the end wall 270 to the longitudinal chamber passage 272. In particular, the ledge 276 is tapered in correspondence with a second tapered wall 278 of the valve body 204.

The extension locking valve assembly 148 is operable to move the valve body 204 between a locked and unlocked position in substantially the same manner as described with respect to the compression locking valve assembly 146, except that the extension locking valve assembly 148 moves to the locked position in response to movement of the shaft 136 and piston 152 (FIG. 8) exceeding a threshold velocity in the extension direction (i.e., to the right of the page in FIGS. 8 and 18). Moreover, in the example embodiment, the extension locking valve assembly 148 provides a negligible resistance to the fluid flow when the shaft 136 and the piston 152 are moved in the compression direction.

In this embodiment, the extension valve chamber 208 and the compression valve chamber 224 are defined within the end tube 178 and the first end cap 196, respectively. In other embodiments the locking assembly 126 may include one or more valve housings (not shown) that are independent of the end tube 178 and/or the first end cap 196, and which define at least one of the extension valve chamber 208 and the compression valve chamber 224.

Figure 19:
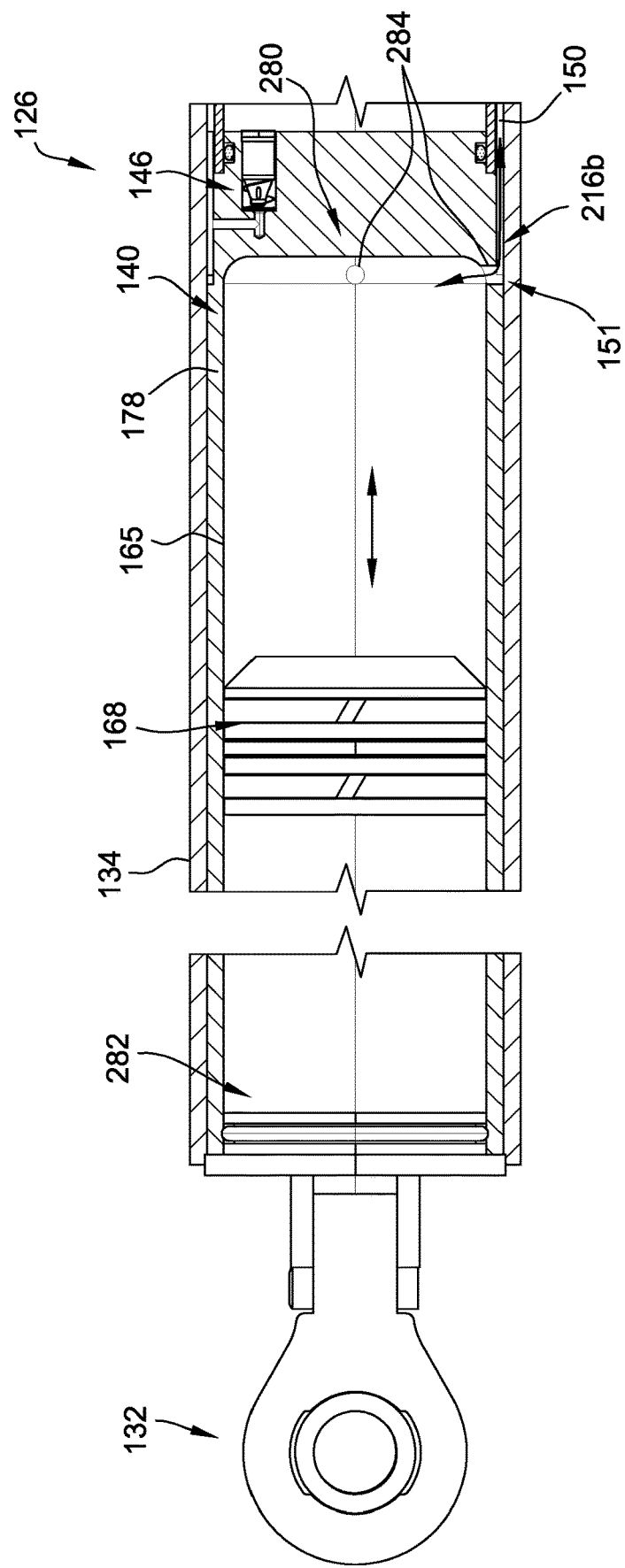
FIG. 19 is a sectional view of a portion of the passive locking assembly shown in FIG. 8 that includes an accumulator.

FIG. 19 is a sectional view of the passive locking assembly 126 showing the accumulator 140. In the example embodiment, accumulator 140 is positioned within the end tube 178. In particular, the accumulator 140 includes the accumulator tube 165 positioned within the end tube 178 and the accumulator piston assembly 168 is received within the accumulator tube 165. In the example embodiment, the end tube 178 and the accumulator tube 165 are integrally formed as a single unitary piece, though in other embodiments the accumulator tube 165 may be separate and simply attached or connected to the end tube 178.

The accumulator tube 165 extends between a first end 280 and an opposed second end 282. The second end 282 is positioned proximate second end 132 of locking assembly 126. The end tube 178 defines a plurality of radial channels 284 extending from the accumulator tube 165 to the second plurality of longitudinal channels 216b. In particular, in the example embodiment, the end tube 178 defines three radial channels 284 (note that two are shown in FIG. 19) circumferentially spaced about the accumulator tube 165, corresponding to the three longitudinal channels 216b shown in FIG. 11)

The accumulator piston assembly 168 is moveable within the accumulator tube 165 in response to fluid entering and exiting the accumulator tube 165. For example, as the piston 152 of the locking assembly 126 is extended out of the inner tube 144 (FIG. 8) fluid within the accumulator tube 165 is drawn into the displacement flow path 150 to fill the volume left by the portion of the shaft 136 that is extended from the inner tube 144. Additionally, the accumulator piston assembly 168 is moved toward the first end 280 of the accumulator tube 165 in response. When the piston 152 of the locking assembly 126 is fully extended out of the inner tube 144, the accumulator piston assembly 168 is positioned adjacent the first end 280.

The accumulator 140 also includes an additional fluid (not shown) between the piston assembly 168 and the second end 282 of the accumulator tube 165 that moves the piston assembly 168 within the accumulator tube 165 in response to fluid leaving the accumulator tube 165. In particular, in the example embodiment, a pressurized gas is provided within the accumulator tube 165 between the piston assembly 168 and the second end 282 to prevent loose movement of the piston assembly 168 within the accumulator tube 165 and bias the piston assembly toward the first end 280. When the piston 152 of the locking assembly 126 is fully retracted, excess fluid in the accumulator flow path 151 is directed through the radial channels 284 and into the accumulator tube 165, moving the piston assembly 168 towards the second end 282. In the example embodiment, the gas is an inert gas, specifically nitrogen, though any suitable gas may be used in other embodiments.

Figure 20:
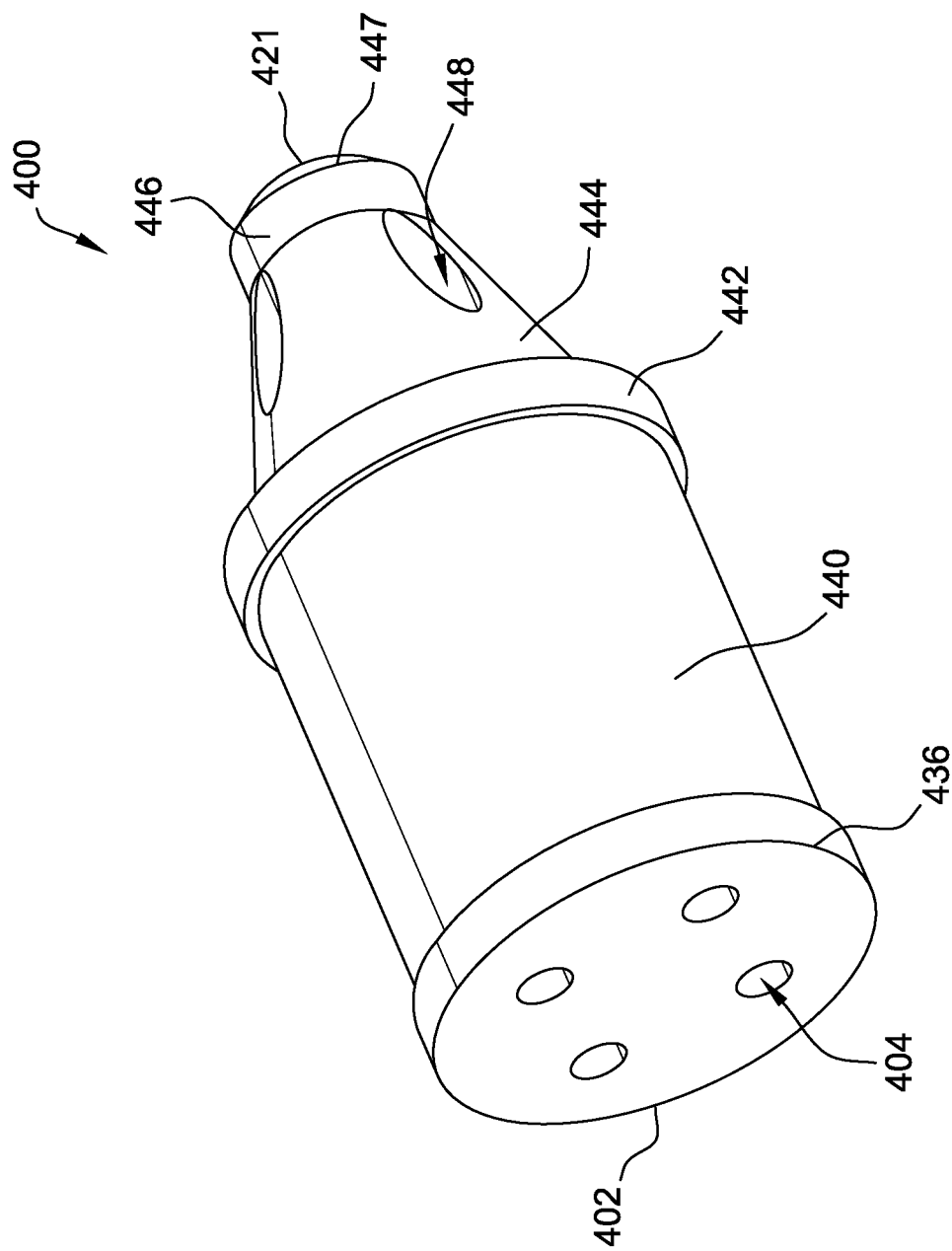
FIG. 20 is a perspective view of another embodiment of a valve body for use with the passive locking assembly of FIG. 5.
Figure 21:
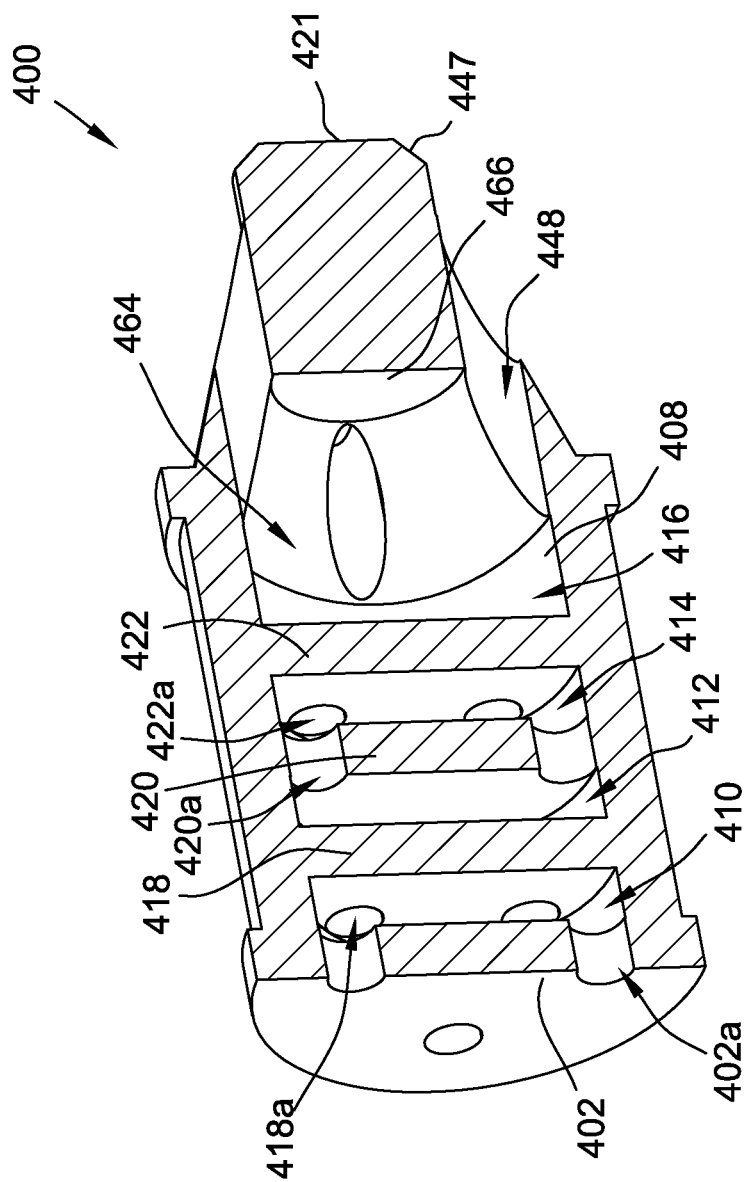
FIG. 21 is a sectional view of the valve body shown in FIG. 20.
Figure 22:
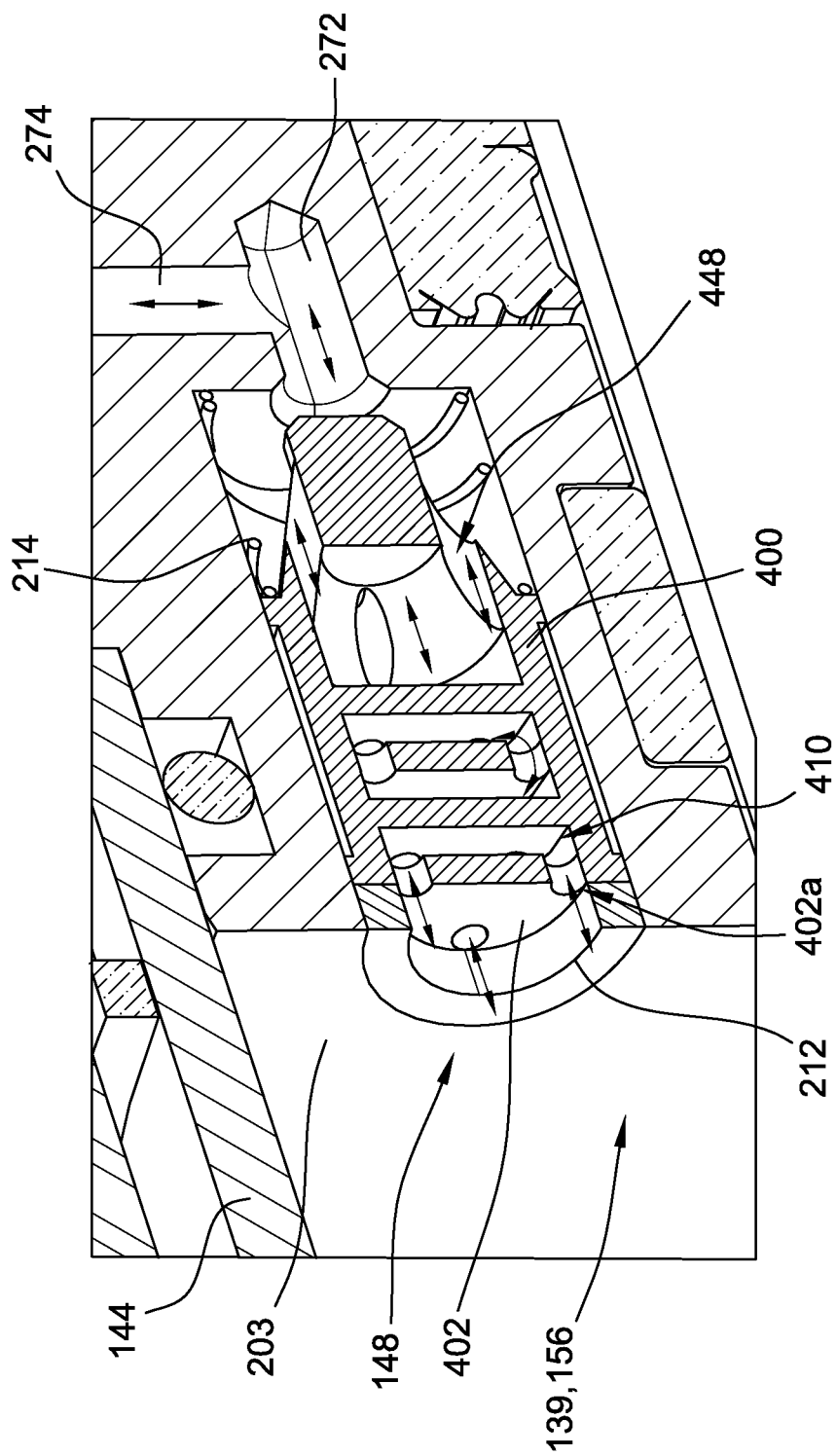
FIG. 22 is an enlarged perspective view of the region C shown in FIG. 8, including the valve body of FIG. 20.

FIG. 20 is a perspective view of an alternative valve body 400 for use in either the compression locking valve assembly 146 or the extension locking valve assembly 148 described above. FIG. 21 is a sectional view of the alternative valve body 400 shown in FIG. 20. FIG. 22 is a sectional view of portion of the locking assembly 126 shown in FIG.

18, replacing the valve body 220 of FIG. 18 with the alternative valve body 400 of FIGS. 20 and 21.

The valve body 400 is substantially the same as valve body 220, shown in FIG. 12, except as described differently below. In the example embodiment, the valve body 220 extends between a stopper end 421 and an end face 402. The end face 402 defines a first plurality of passages 404 extending through the end face 402. In particular, the first plurality of passages 404 include four passages 404 circumferentially spaced on the end face 402.

The valve body 400 includes a first rib 436 at the end face 402 and a cylindrical outer surface 440 extending axially from the first rib 436 to a second rib 442. The cylindrical outer surface 440 is radially recessed relative to the first and second ribs 436, 442. A first tapered wall 444 extends axially from the second rib 442 to the stopper end 421. The first tapered wall 444 defines a plurality of ports 448 extending therethrough. The stopper wall 446 extends from the first tapered wall 444 to a second tapered wall 447 (FIG. 21), which tapers inwardly to the stopper end 421.

Referring to FIG. 21, the valve body 400 further includes an interior chamber wall 408, a plurality of drag plates 418-422 extending across the interior chamber wall 408, and a drag end surface 466. The interior chamber wall 408, the drag plates 418-422, and the drag end surface 466 cooperatively define a plurality of chamber sections 410-416 within a valve cavity 464 of the valve body 400. The drag plates 418-422 are each axially spaced from at least one opposing drag plate and define the respective chamber sections 410-416 therebetween. For example, a first chamber section 410 is defined between the end face 402 and a first drag plate 418. A second chamber section 412 is defined between the first drag plate 418 and a second drag plate 420. A third chamber section 414 is defined between the second drag plate 420 and a third drag plate 422, and a fourth chamber section 416 is defined between the third drag plate 422 and the drag end surface 466. In other embodiments, the valve body 400 may include any suitable number of drag plates 418-422 and/or chamber sections 410-416. The valve body 400 and/or portions of the valve body 400, such as the drag plates 418-422, may be formed by a die casting or by an additive manufacturing process.

Each of the drag plates 418-422 define a plurality of passages 418a-422a extending therethrough. In the example embodiment, each of the drag plates 418-422 define four circumferentially spaced passages 418a-422a. The passages 418a-422a provide flow connection between adjacent chamber sections 410-416. In this example, because the drag plates 418-422 span the interior chamber wall 408, the passages 418a-422a provide the only path for fluid to flow into adjacent chamber sections 410-416. Moreover, the passages 418a-422a are defined in the plates 418-422 circumferentially offset from the passages of adjacent plates 418-422. In the embodiment of FIG. 21, each of the four passages 418a defined in the first drag plate 418 are positioned approximately circumferentially between two of the passages 402a in the end face 402 and two of the passages 420a the second drag plate 420.

FIG. 21 shows the alternative valve body 400 of FIGS. 19 and 20 in the extension valve assembly 148 of FIG. 18. During operation, as the piston 152 (FIG. 8) is moved in the extension direction, fluid is directed from the fluid chamber 139 within the inner tube 144 through the valve seat 212. Fluid flows through the passages 402a defined in the end face 402 and into the first chamber section 410. Fluid then flows through each of the chamber sections 410-416 in the offset passages 418a-422a (FIG. 21) and out of the ports 448. After exiting the ports 448, fluid flows into the longitudinal chamber passage 272 to the radial channel 274 and to the outer fluid channel 138 (FIG. 18) in substantially the same manner as described above with respect to FIG. 18.

As fluid is directed through the chamber sections 410-416, fluid applies a force on the end face 402 and drag plates 418-422 at least partially due to the passages 418a-422a in each of the drag plates 418-422 being circumferentially offset from the passages on adjacent plates. In this example, the end face 402 and the drag plates 418-422 provide an increased total surface area of the valve body 400 that the fluid flow acts on, as compared to valve body 220, shown in FIG. 18. At a given velocity of fluid flow, the fluid will exert a greater force on the valve body 220 of FIG. 22 as compared to the valve body 400 of FIG. 18. As a result, a lower fluid velocity is needed to move valve body 400 to the locked position compared to the valve body 220 of FIG. 18. In particular, in the example embodiment, the threshold shaft velocity of a valve assembly 148 including the valve body 400 is approximately 3 millimeters per second (mm/s). In other embodiments, the threshold shaft velocity for the valve assemblies 146, 148 may be additionally or alternative adjusted by changing a spring constant of the biasing element 214, changing the size of the valve body 400, and/or providing additional drag features on the valve body 400.

Figure 23:
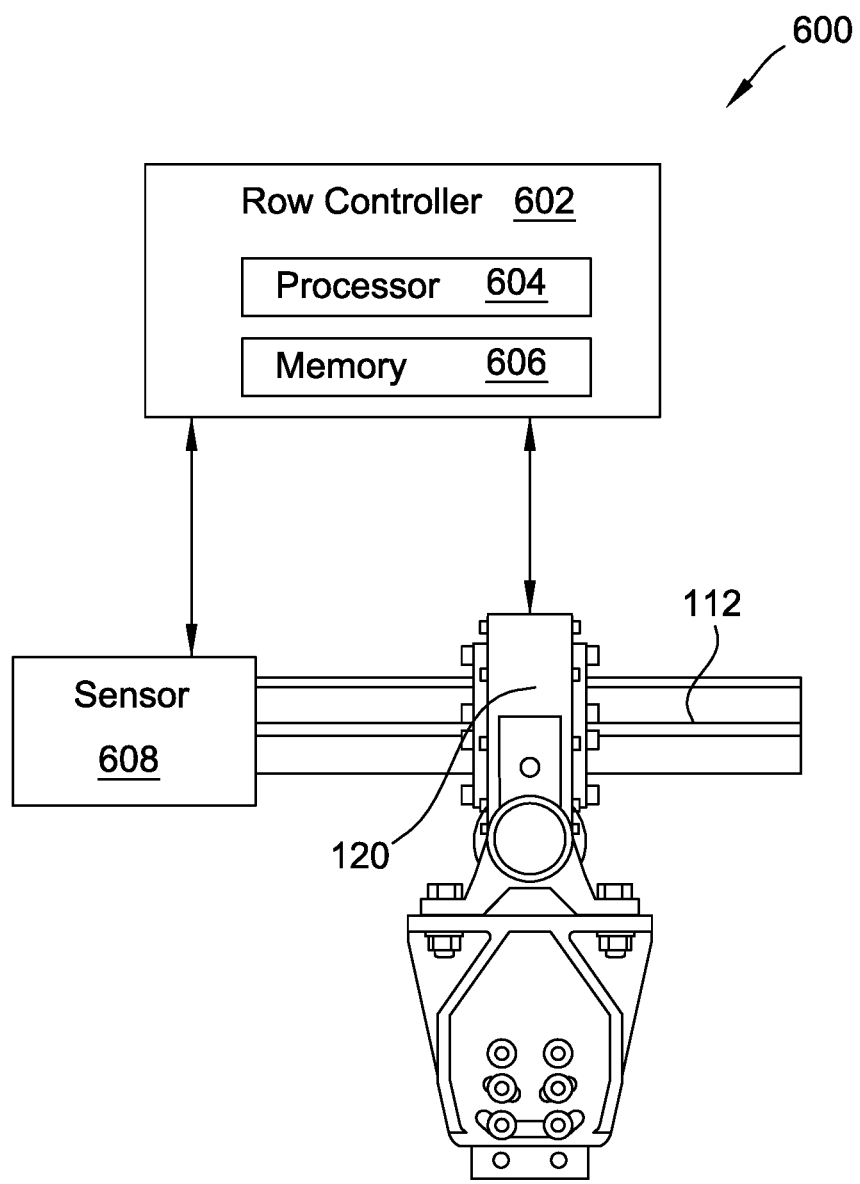
FIG. 23 is a schematic view of a control system for use in the solar tracker system of FIG. 1.

FIG. 23 is a schematic showing a control system 600 for controlling the solar tracker system 100 shown in FIG. 1. In the example embodiment, the control system 600 includes a row controller 602 including a processor 604 and a memory 606. The row controller 600 is communicatively connected to the drive 120 and operable to control operation of the drive 120. A sensor 608 is coupled to the torque tube 112 and is communicatively coupled to the controller 602. The sensor 608 is operable to detect one or more characteristics of the solar array row 102 indicating whether the passive locking assembly 126 is in the locked state and/or unlocked.

In the embodiment of FIG. 23, the control system 600 determines whether the passive locking assembly is in either the locked or unlocked state based on readings provided by the sensor 608, and controls the drive 120 based on the determination. For example, when the passive locking assembly 126 (FIG. 4) is in the locked state, the passive locking assembly 126 provides a resistance force of up to 50 kilonewtons on the torque tube 112. As a result, operation of the drive 120 with the passive locking assembly 126 in the locked state may not rotate the torque tube 112 and may damage the drive 120 and/or the torque tube 112. The control system 600 of the present embodiment stops actuation of the drive 120 if the controller 602 determines that the locking assembly 126 is in the locked state.

In the embodiment of FIG. 23, the sensor 608 is a strain gauge coupled to the torque tube 112. The sensor 608 is coupled in wired communication with the row controller 602, though in other embodiments, the sensor 608 may include a wireless transceiver for wirelessly communicating with the row controller 602. Based on the readings from the strain gauge sensor 608, the controller 602 determines whether the locking assembly 126 is in the locked state. When the locking assembly 126 is in the locked state, operation of the drive 120 increases strain in the torque tube 112. The memory 606 may store one or more predefined strain thresholds, indicative of the locking assembly 126 being in the locked state. If the strain readings from the sensor 608 exceed the predefined strain threshold, the controller 602 determines that the assembly 126 is in the locked state and halts operation of the drive. After a predefined time interval, the controller 602 operates the drive 120 and determines the resulting strain in the torque tube detected by the sensor 608. If the detected strain is below the threshold, the controller 602 determines that the assembly is in the unlocked state and resumes normal operational control of the drive 120. If the detected strain is at or above the threshold, the controller 602 determines that the assembly is in the locked state and repeats the process until the assembly is determined to be in the unlocked state.

In other embodiments, the control system 600 may include any number of sensors 608 suitable for the control system to operate as described herein. For example, the control system 600 may include a second strain gauge sensor (not shown) connected to the torque tube 112 on an opposite side of the drive 120.

In other embodiments, the sensor 608 may not be a strain gauge or even be connected to the torque tube 112. For example, the sensor 608 may detect the current draw of the drive 120 and the controller 602 may determine whether the locking assembly is in the locked state based on the current draw of the drive 120. In another example, the sensor 608 is a position sensor, such as a linear potentiometer, installed on and/or within the locking assembly 126. In this example, the sensor 608 detects a position of one or more components of the valve assemblies 146, 148 and the controller 602 determines whether the locking assembly 126 is in the locked or unlocked state based on the detected position.

In some embodiments, the above systems and methods are electronically or computer controlled. The embodiments described are not limited to any particular system controller or processor for performing the processing tasks described herein. The term "controller" or "processor", as used herein, is intended to denote any machine capable of performing the calculations, or computations, necessary to perform the tasks described herein. The terms "controller" and "processor" also are intended to denote any machine capable of accepting a structured input and of processing the input in accordance with prescribed rules to produce an output. It should also be noted that the phrase "configured to" as used herein means that the controller/processor is equipped with a combination of hardware and software for performing the tasks of embodiments of the disclosure, as will be understood by those skilled in the art. The terms "controller" and "processor", as used herein, refers to central processing units, microprocessors, microcontrollers, reduced instruction set circuits (RISC), application specific integrated circuits (ASIC), logic circuits, and any other circuit or processor capable of executing the functions described herein.

The computer implemented embodiments described embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A solar tracker system comprising:
   a torque tube;
   a column supporting the torque tube;
   a solar panel connected to the torque tube; and
   a locking assembly having a first end pivotably connected to the torque tube and a second end pivotably connected to the column, the locking assembly comprising:
      a shell defining a fluid chamber therein;
      a piston positioned within the shell, the piston including a seal that seals against the shell, the piston at least partially defining a compression portion of the fluid chamber and an extension portion of the fluid chamber;
      a flow path extending between the compression portion of the fluid chamber and the extension portion of the fluid chamber; and a first valve assembly for controlling fluid flow in a first direction through the flow path from the compression portion to the extension portion; and a second valve assembly for controlling fluid flow in a second direction through the flow path from the extension portion to the compression portion, wherein the first valve assembly and the second valve assembly are each passively moveable from an unlocked state to a locked state in response to movement of the piston.

2. The solar tracker system of claim 1, wherein the locking assembly further includes:

a first chamber wall defining a first valve chamber; and a second chamber wall defining a second valve chamber, the flow path fluidly connecting the first valve chamber and the second valve chamber, and wherein the first valve assembly is positioned within the first valve chamber and the second valve assembly is positioned within the second valve chamber.

3. The solar tracker system of claim 2, wherein the first valve assembly includes a valve body contacting the first chamber wall and a biasing element engaged with the valve body for biasing the valve body within the first valve chamber to the unlocked state.

4. The solar tracker system of claim 3, wherein the first chamber wall defines a chamber passage extending from the first valve chamber and fluidly connecting the first valve chamber to the second valve chamber, and wherein the valve body includes a stopper end sized to extend into the chamber passage when the valve body is moved into a locked state.

5. The solar tracker system of claim 3, wherein valve body includes a first end and a second, opposed end, the first end defining a fluid opening for directing fluid flow into a valve cavity defined by the valve body, the valve body further defining a port proximate the second end for fluid to flow between the valve cavity and exterior of the valve body within the first valve chamber.

6. The solar tracker system of claim 5, wherein the valve body includes an interior chamber wall defining the valve cavity and a plurality of axially spaced drag plates extending across the interior chamber wall, the plurality of drag plates defining a plurality of chamber sections within the valve cavity, and wherein each drag plate defines a passage for providing fluid communication between adjacent chamber sections.

7. The solar tracker system of claim 1, wherein the first valve assembly and the second valve assembly are each independently moveable between the unlocked state and the locked state.

8. The solar tracker system of claim 7, wherein movement of the piston within the shell is prevented when a least one of the first valve assembly and the second valve assembly is in the locked state.

9. The solar tracker system of claim 1, wherein the first valve assembly fluidly connects the compression portion and the flow path, and wherein the first valve assembly moves to the locked state in response to a compression velocity of the piston exceeding a first threshold.

10. The solar tracker system of claim 9, wherein the second valve assembly fluidly connects the extension portion and the flow path, and wherein the second valve assembly moves to the locked state in response to an extension velocity of the piston exceeding a second threshold.

11. The solar tracker system of claim 10, wherein the first threshold is substantially the same as the second threshold.

12. The solar tracker system of claim 1, wherein the first valve assembly, when in the locked state, provides a locking force against rotation of the torque tube in a first rotational direction and wherein the second valve assembly provides, when in the locked state, provides a locking force against rotation of the torque tube in a second, opposite rotational direction.

13. A solar tracker system comprising:

a torque tube;

a column supporting the torque tube;

a solar panel connected to the torque tube; and a locking assembly having a first end pivotably connected to the torque tube and a second end pivotably connected to the column, the locking assembly comprising:

a shell defining a fluid chamber therein;

a piston positioned within the shell and at least partially defining a compression portion of the fluid chamber and an extension portion of the fluid chamber;

a flow path extending between the compression portion of the fluid chamber and the extension portion of the fluid chamber; and a first valve assembly fluidly connecting the compression portion of the fluid chamber with the flow path, the first valve assembly being passively movable to restrict fluid flow from the compression portion into the flow path; and a second valve assembly fluidly connecting the extension portion of the fluid chamber with the flow path, the second valve assembly being passively movable to restrict fluid flow from the extension portion into the flow path.

14. The solar tracker system of claim 13, wherein the locking assembly further includes:

a first chamber wall defining a first valve chamber; and a second chamber wall defining a second valve chamber, the flow path fluidly connecting the first valve chamber and the second valve chamber, and wherein the first valve assembly is positioned within the first valve chamber and the second valve assembly is positioned within the second valve chamber.

* * * * *